United States Patent
Liu et al.

(10) Patent No.: US 9,853,505 B2
(45) Date of Patent: Dec. 26, 2017

(54) RESONANT WIRELESS POWER RECEIVER CIRCUIT AND CONTROL CIRCUIT AND WIRELESS POWER CONVERSION METHOD THEREOF

(71) Applicant: RICHTEK TECHNOLOGY CORPORATION, Zhubei, HsinChu (TW)

(72) Inventors: Kuo-Chi Liu, Hsinchu (TW); Wei-Hsin Wei, Zhubei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 93 days.

(21) Appl. No.: 15/144,553

(22) Filed: May 2, 2016

(65) Prior Publication Data
US 2016/0336808 A1  Nov. 17, 2016

Related U.S. Application Data

(60) Provisional application No. 62/161,912, filed on May 15, 2015.

(51) Int. Cl.
| | |
|---|---|
| H01F 27/42 | (2006.01) |
| H01F 37/00 | (2006.01) |
| H01F 38/00 | (2006.01) |
| H02J 50/12 | (2016.01) |
| H02M 7/219 | (2006.01) |
| H02M 7/217 | (2006.01) |

(52) U.S. Cl.
CPC ............ *H02J 50/12* (2016.02); *H02M 7/217* (2013.01); *H02M 7/219* (2013.01); *Y02B 70/1441* (2013.01)

(58) Field of Classification Search
USPC .................................................. 307/104, 108
See application file for complete search history.

(56) References Cited

U.S. PATENT DOCUMENTS

| | | | | |
|---|---|---|---|---|
| 2009/0174263 | A1* | 7/2009 | Baarman ................. | H02J 5/005 307/104 |
| 2014/0077696 | A1* | 3/2014 | Kuennen .................. | A61L 2/10 315/34 |
| 2015/0035376 | A1* | 2/2015 | Baarman ................. | H02J 5/005 307/104 |

(Continued)

*Primary Examiner* — Adam Houston
(74) *Attorney, Agent, or Firm* — Tung & Associates

(57) ABSTRACT

The present invention provides a resonant wireless power receiver circuit, including: a resonant circuit for receiving a wireless power to generate an AC resonant signal; a switch controlled rectifier circuit which includes a multi-mode switch circuit, for rectifying the AC resonant signal into a rectifier output signal to drive a load, wherein the multi-mode switch circuit includes at least one multi-mode switch; and a feedback control circuit for generating a switch control signal according to a feedback signal related to the rectifier output signal to control the at least one multi-mode switch such that it operates at least in a Resonance Short Circuit Operation to limit the rectifier output signal or to regulate the rectifier output signal. In the Resonance Short Circuit Operation, a positive resonant output node and a negative resonant output node are short-circuited by the multi-mode switch circuit.

36 Claims, 10 Drawing Sheets

(56) References Cited

U.S. PATENT DOCUMENTS

| | | | |
|---|---|---|---|
| 2015/0302983 A1* | 10/2015 | Park | H02J 50/12 |
| | | | 320/108 |
| 2016/0006267 A1* | 1/2016 | Muratov | B60L 11/1812 |
| | | | 307/104 |
| 2016/0013663 A1* | 1/2016 | Zhang | H01F 38/14 |
| | | | 307/104 |
| 2016/0043568 A1* | 2/2016 | Raghunathan | H02J 5/005 |
| | | | 307/104 |
| 2016/0056640 A1* | 2/2016 | Mao | H02J 50/80 |
| | | | 307/104 |
| 2016/0254679 A1* | 9/2016 | Liu | H02J 50/12 |
| | | | 307/104 |

* cited by examiner

RESONANT WIRELESS POWER RECEIVER CIRCUIT AND CONTROL CIRCUIT AND WIRELESS POWER CONVERSION METHOD THEREOF

CROSS REFERENCE

The present invention claims priority to U.S. 62/161,912, filed on May 15, 2015.

BACKGROUND OF THE INVENTION

1. Field of Invention

The present invention relates to a resonant wireless power receiver circuit, particularly, to a resonant wireless power receiver circuit with a switching controlled rectifier circuit. The present invention also relates to a control circuit and a resonant wireless power conversion method.

2. Description of Related Art

FIG. 1 shows a prior art resonant wireless power receiver circuit 1. The resonant wireless power receiver circuit 1 comprises a resonant circuit 31, a bridge rectifier circuit 33, a DC-DC conversion circuit 34 and a load 35.

The wireless power transmission is achieved as thus. In FIG. 1, a resonant wireless power transmitter circuit (not shown) transmits a wireless power 40 to a wireless field (for example but not limited to a magnetic field, an electric field or an electromagnetic field). The wireless power 40 in the wireless field is received by the resonant wireless power receiver circuit 1 with the resonance effect of the resonant circuit 31 through for example but not limited to coupling, induced by, or capturing the wireless power 40 in the wireless field. A resonant output voltage VAC is generated at an output of the resonant circuit 31. The rectifier circuit 33 rectifies the resonant output voltage VAC to generate a rectified output voltage VRECT which is then converted by the DC-DC converter 34 to generate an output voltage VOUT to drive the load 35.

The prior art in FIG. 1 has a drawback that the rectified output voltage VRECT may be too low or too high. And, due to the uncertain level of the rectified output voltage VRECT, an extra regulation circuit (e.g. DC-DC conversion circuit 34) is required to generate a stable output voltage.

Since the operation of the prior art shown in FIG. 1 is based on resonance effect, if the resonant frequency transmitted by the resonant wireless power transmit circuit drifts from its preset frequency, or if the receiver circuit is not properly located at a proper relative distance and a proper relative angle, or if there are multiple resonant wireless power receiver circuits coupled to receive the wireless power at the same time, off resonance could happen. If the off resonance is not corrected or controlled, it could cause power loss, or the received voltage (for example the resonant output voltage VAC and the rectified output voltage VRECT) could be too low such that circuits at the following stage (such as the DC-DC converter 34 and the load 35) cannot function properly. Furthermore, nowadays there are more and more wireless power transmission applications, so in some circumstances, the resonant wireless power receiver circuit may receive wireless power transmitted from non-corresponding wireless power systems or even from other wireless communication systems (for example but not limited to NFC, Near Field Communication). Under these unexpected circumstances, the voltage (for example the resonant output voltage VAC and the rectified output voltage VRECT) received by the resonant wireless power receiver circuit 1 could be too high. An overly high voltage due to any reason could cause damage of the internal circuit or damage of the load of the resonant wireless power receiver circuit 1 (for example but not limited to the DC-DC converter 34 and the load 35).

FIG. 2 shows a Bridge Doubler Rectifier according to a prior art rectifier circuit disclosed by U.S. Pat. No. 4,268,899. When CR5 is not conductive, the Bridge Doubler Rectifier operates in 1× voltage mode, and when CR5 is conductive, it operates in 2× voltage mode. The prior art in FIG. 2 has the following drawbacks: (A) it requires two output capacitors connected to each other in series, so the equivalent capacitance is half of that of a single capacitor; (B) CR5 has to be a bi-directional control switch; (C) there are only two options for its output voltage, nevertheless as mentioned previously, since the power received by the resonant wireless power receiver circuit with resonance effect is uncertain, the output voltage generated by the prior art rectifier may be too low in 1× mode and too high in 2× mode, i.e., neither 1× nor 2× is proper, which may lead to malfunction or damage of circuits in its following stages.

FIG. 3 shows a prior art resonant wireless power receiver circuit with an over voltage protection circuit. This prior art includes a switch 220 which is connected in series between a rectifier and a target resonator. When an over voltage is detected, the switch 220 is switched OFF for over voltage protection. A drawback of this prior art is that the switch 220 must have an un-preferred relatively high voltage rating for tolerating the energy which is stored in and released from the target resonator.

Compared to the prior art in FIG. 1, the present invention has an advantage that the rectifier output is feedback controlled, such that the output voltage of the rectifier circuit is not too high nor too low. Another important advantage is that, since the present invention provides a stable rectifier output voltage or current, the DC-DC conversion circuit can be omitted, which greatly reduces the cost.

Compared to the prior art in FIG. 2, the present invention has an advantage that the rectifier output is adjustable in a continuous way, such that the output voltage of the rectifier circuit is not too high nor too low. Another advantage is that the present invention can operate with less components and with lower voltage/current rating components, so the present invention can reduce the manufacture cost.

Compared to the prior art in FIG. 3, the present invention can operate with lower voltage/current rating components, and is able to provide the over voltage/current protection using components inherent in the conventional rectifier circuit, so the present invention can reduce the manufacture cost.

SUMMARY OF THE INVENTION

From one perspective, the present invention provides a resonant wireless power receiver circuit, comprising: a resonant circuit which includes a receiver coil, configured to operably receive a wireless power to generate an AC resonant signal between a positive resonant output node and a negative resonant output node, wherein the AC resonant signal includes an AC resonant voltage, and the AC resonant voltage has an amplitude; a switch controlled rectifier circuit, configured to operably convert the AC resonant signal to generate a rectified output signal between a rectified output node and a ground node, wherein the rectified output signal includes a rectified output voltage and a rectified output current, wherein the switch controlled rectifier circuit includes a multi-mode switch circuit which includes at least one multi-mode switch; and a feedback control circuit, configured to operably generate a multi-mode switch control signal for controlling the multi-mode switch circuit according to a voltage feedback signal related to the rectified output voltage and/or a current feedback signal related to the rectified output current, such that the multi-mode switch circuit operates at least in a portion of time in a Resonance Short Circuit Operation to limit a level of the rectified output voltage not larger than a rectified output voltage threshold, and/or to limit a level of the rectified output current not larger than a rectified output current threshold, and/or to regulate the rectified output voltage at a level corresponding to a level of an output voltage reference signal, and/or to regulate the rectified output current at a level corresponding to a level of an output current reference signal; wherein in the "Resonance Short Circuit Operation", the multi-mode switch circuit operates such that the positive resonant output node and the negative resonant output node are short circuited.

In one embodiment, the switch controlled rectifier circuit includes a bridge rectifier circuit which includes a first rectifier device, a second rectifier device, and the multi-mode switch circuit, wherein the multi-mode switch circuit includes a first multi-mode switch and a second multi-mode switch, wherein each of the first rectifier device, the second rectifier device, the first multi-mode switch and the second multi-mode switch has a current inflow node and a current outflow node; wherein the bridge rectifier circuit is configured as (A) or (B): (A) the current outflow nodes of the first rectifier device and the second rectifier device being connected to each other at the rectified output node; the current inflow nodes of the first multi-mode switch and the second multi-mode switch being connected to each other at the ground node; the current inflow node of the first rectifier device and the current outflow node of the first multi-mode switch being connected to each other at the negative resonant output node; and the current inflow node of the second rectifier device and the current outflow node of the second multi-mode switch being connected to each other at the positive resonant output node; or (B) the current outflow nodes of the first multi-mode switch and the second multi-mode switch being connected to each other at the rectified output node; the current inflow nodes of the first rectifier device and the second rectifier device being connected to each other at the ground node; the current inflow node of the first multi-mode switch and the current outflow node of the first rectifier device being connected to each other at the negative resonant output node; and the current inflow node of the second multi-mode switch and the current outflow node of the second rectifier device being connected to each other at the positive resonant output node; wherein the feedback control circuit controls the first and the second multi-mode switches by the multi-mode switch control signal, such that the first and the second multi-mode switches operate in a time-divided combination of any two or more among a Synchronous Rectifying Switching Operation, a Resonance Short Circuit Operation, and an OSOC (One Synchronous-rectifying-switching, One Conductive Operation) Operation to regulate the rectified output voltage at the level corresponding to the level of the output voltage reference signal, and/or to regulate the rectified output current at the level corresponding to the level of the output current reference signal.

In one embodiment, the switch control circuit is configured to operably control the first and the second multi-mode switches by the multi-mode switch control signal to operate in the Resonance Short Circuit Operation so as to limit a level of the AC resonant signal when the level of the rectified output voltage is larger than the rectified output voltage threshold and/or when the level of the rectified output current is larger than the rectified output current threshold, such that the level of the rectified output voltage is limited to be not larger than the rectified output voltage threshold, and/or the level of the rectified output current is limited to be not larger than the rectified output current threshold.

In one embodiment, the resonant circuit further includes an impedance matching circuit which includes one impedance matching capacitor coupled to the receiver coil in series or in parallel, or which includes two or more impedance matching capacitors coupled in series, or in parallel, or in a combination of parallel and series, and the two or more impedance matching capacitors being coupled to the receiver coil.

In one embodiment, the first rectifier device and the second rectifier device are configured as (A), (B), or (C): (A) each of the first rectifier device and the second rectifier device including a diode, wherein the anodes and the cathodes of the diodes correspond to the current inflow nodes and the current outflow nodes of the first rectifier device and the second rectifier device respectively; (B) the first rectifier device including a third multi-mode switch and the second rectifier device including a forth multi-mode switch, wherein the feedback control circuit controls the third multi-mode switch and the forth multi-mode switch by the multi-mode switch control signal to operate in the Synchronous Rectifying Switching Operation; or (C) the first rectifier device and the second rectifier device being a combination of a diode and a third multi-mode switch, wherein the anode and the cathode of the diode correspond to the current inflow node and the current outflow node of the first rectifier device or the second rectifier device, and the feedback control circuit controls the third multi-mode switch by the multi-mode switch control signal to operate in the Synchronous Rectifying Switching Operation.

In one embodiment, each of the first and the second multi-mode switches includes a semiconductor switch.

In one embodiment, the bridge rectifier circuit further includes a first bypass diode and a second bypass diode; the first and the second multi-mode switches are connected to the first and the second bypass diode in parallel respectively.

In one embodiment, the switch controlled rectifier circuit further includes a rectifier device, and each of the rectifier device and the multi-mode switch has a current inflow node and a current outflow node; wherein the multi-mode switch and the rectifier device are configured as (A) or (B): (A) the current outflow node of the multi-mode switch and the current inflow node of the rectifier device being connected to each other at the positive resonant output node, the current inflow node of the multi-mode switch being connected to the negative resonant output node, the current outflow node of the rectifier device being connected to the rectified output node, and the negative resonant output node being connected to the ground node; or (B) the current inflow node of the multi-mode switch and the current outflow node of the rectifier device being connected to each other at the positive resonant output node, the current outflow node of the multi-mode switch being connected to the rectified output node, the current inflow node of the rectifier device being connected to the ground node, the negative resonant output node being connected to the rectified output node; wherein the feedback control circuit controls the multi-mode switch by the multi-mode switch control signal, such that the multi-mode switch operate in a time-divided combination of a Synchronous Rectifying Switching Operation and a Resonance Short Circuit Operation to regulate the rectified output voltage at the level corresponding to the level the output voltage reference signal, and/or to regulate the rectified output current at the level corresponding to the level of the output current reference signal.

In one embodiment, the switch control circuit is configured to operably control the multi-mode switch by the multi-mode switch control signal to operate in the Resonance Short Circuit Operation so as to limit a level of the AC resonant signal when the voltage level of the rectified output voltage is larger than the rectified output voltage threshold and/or when the current level of the rectified output current is larger than the rectified output current threshold, such that the level of the rectified output voltage is limited to be not larger than the rectified output voltage threshold, and/or the level of the rectified output current is limited to be not larger than the rectified output current threshold.

From another perspective, the present invention provides a feedback control circuit, configured to operably control a resonant wireless power receiver circuit which comprises: a resonant circuit which includes a receiver coil, configured to operably receive a wireless power to generate an AC resonant signal between a positive resonant output node and a negative resonant output node, wherein the AC resonant signal includes an AC resonant voltage, and the AC resonant voltage has an amplitude; and a bridge rectifier circuit, configured to operably convert the AC resonant signal to generate a rectified output signal between a rectified output node and a ground node, wherein the rectified output signal includes a rectified output voltage and a rectified output current, wherein the bridge rectifier circuit includes a first rectifier device, a second rectifier device, and a multi-mode switch circuit which includes a first multi-mode switch and a second multi-mode switch, wherein each of the first rectifier device, the second rectifier device, the first multi-mode switch and the second multi-mode switch has a current inflow node and a current outflow node; wherein the bridge rectifier circuit is configured as (A) or (B): (A) the current outflow nodes of the first rectifier device and the second rectifier device being connected to each other at the rectified output node; the current inflow nodes of the first multi-mode switch and the second multi-mode switch being connected to each other at the ground node; the current inflow node of the first rectifier device and the current outflow node of the first multi-mode switch being connected to each other at the negative resonant output node; and the current inflow node of the second rectifier device and the current outflow node of the second multi-mode switch being connected to each other at the positive resonant output node; or (B) the current outflow nodes of the first multi-mode switch and the second multi-mode switch being connected to each other at the rectified output node; the current inflow nodes of the first rectifier device and the second rectifier device being connected to each other at the ground node; the current inflow node of the first multi-mode switch and the current outflow node of the first rectifier device being connected to each other at the negative resonant output node; and the current inflow node of the second multi-mode switch and the current outflow node of the second rectifier device being connected to each other at the positive resonant output node; the feedback control circuit includes: an error feedback circuit, configured to operably generate a voltage error feedback signal according to a voltage feedback signal related to the rectified output voltage and/or to generate a current error feedback signal according to a current feedback signal related to the rectified output current; a synchronous control circuit, configured to operably generate a synchronous control signal according to the rectified output signal and the AC resonant signal; and a switch control circuit, configured to operably generate a multi-mode switch control signal for controlling the multi-mode switch circuit according to the voltage error feedback signal and/or the current error feedback signal such that the multi-mode switch circuit operates in a time-divided combination of any two or more among a Synchronous Rectifying Switching Operation, a Resonance Short Circuit Operation, and an OSOC (One Synchronous-rectifying-switching, One Conductive Operation) Operation to regulate the rectified output voltage to a level corresponding to a level the output voltage reference signal, and/or to regulate the rectified output current to a level corresponding to a level of the output current reference signal; wherein in the "Resonance Short Circuit Operation", the multi-mode switch circuit operates such that the positive resonant output node and the negative resonant output node are short-circuited.

From another perspective, the present invention provides a feedback control circuit, configured to operably control a resonant wireless power receiver circuit which comprises: a resonant circuit which includes a receiver coil, configured to operably receive a wireless power to generate an AC resonant signal between a positive resonant output node and a negative resonant output node, wherein the AC resonant signal includes an AC resonant voltage, and the AC resonant voltage has an amplitude; and a bridge rectifier circuit, configured to operably convert the AC resonant signal to generate a rectified output signal between a rectified output node and a ground node, wherein the rectified output signal includes a rectified output voltage and a rectified output current, wherein the bridge rectifier circuit includes a first rectifier device, a second rectifier device, and a multi-mode switch circuit which includes a first multi-mode switch and a second multi-mode switch, wherein each of the first rectifier device, the second rectifier device, the first multi-mode switch and the second multi-mode switch has a current inflow node and a current outflow node; wherein the bridge rectifier circuit is configured as (A) or (B): (A) the current outflow nodes of the first rectifier device and the second rectifier device are connected to each other at the rectified output node; the current inflow nodes of the first multi-mode switch and the second multi-mode switch being connected to each other at the ground node; the current inflow node of the first rectifier device and the current outflow node of the first multi-mode switch being connected to each other at the negative resonant output node; and the current inflow node of the second rectifier device and the current outflow node of the second multi-mode switch being connected to each other at the positive resonant output node; or (B) the current outflow nodes of the first multi-mode switch and the second multi-mode switch being connected to each other at the rectified output node; the current inflow nodes of the first rectifier device and the second rectifier device being connected to each other at the ground node; the current inflow node of the first multi-mode switch and the current outflow node of the first rectifier device being connected to each other at the negative resonant output node; and the current inflow node of the second multi-mode switch and the current outflow node of the second rectifier device being connected to each other at the positive resonant output node; the feedback control circuit includes: a threshold determination circuit which includes a comparing circuit, configured to operably generate a threshold determination signal by comparing the rectified output voltage with a rectified output voltage threshold or by comparing the rectified output current with a rectified output current threshold; and a switch control circuit, configured to operably generate a multi-mode switch control signal for controlling the multi-mode switch circuit according to the threshold determination signal such that the multi-mode switch circuit operates in the Resonance Short Circuit Operation so as to limit a level of the AC resonant signal, and such that a level of the rectified output voltage is limited to be not larger than the rectified output voltage threshold, and/or a level of the rectified output current is limited to be not larger than the rectified output current threshold; wherein in the "Resonance Short Circuit Operation", the multi-mode switch circuit operates such that the positive resonant output node and the negative resonant output node are short-circuited.

From another perspective, the present invention provides a resonant wireless power conversion method, wherein a resonant circuit receives a wireless power and generate an AC resonant signal between a positive resonant output node and a negative resonant output node, wherein the AC resonant signal includes an AC resonant voltage, and the AC resonant voltage has an amplitude; the resonant wireless power conversion method includes: controlling a switch controlled rectifier circuit to convert the AC resonant signal to generate a rectified output signal between a rectified output node and a ground node, wherein the rectified output signal includes a rectified output voltage and a rectified output current, wherein the switch controlled rectifier circuit includes a multi-mode switch circuit which includes at least one multi-mode switch; and generating a multi-mode switch control signal for controlling the multi-mode switch circuit according to a voltage feedback signal related to the rectified output voltage and/or a current feedback signal related to the rectified output current, such that the multi-mode switch circuit operates at least in a portion of time in a Resonance Short Circuit Operation to limit a level of the rectified output voltage not larger than a rectified output voltage threshold, and/or to limit a level of the rectified output current not larger than a rectified output current threshold, and/or to regulate the rectified output voltage at a level corresponding to a level of an output voltage reference signal, and/or to regulate the rectified output current at a level corresponding to a level of an output current reference signal; wherein in the "Resonance Short Circuit Operation", the multi-mode switch circuit operates such that the positive resonant output node and the negative resonant output node are short-circuited.

In one embodiment, the switch controlled rectifier circuit includes a bridge rectifier circuit which includes a first rectifier device, a second rectifier device, and the multi-mode switch circuit which includes a first multi-mode switch and a second multi-mode switch, wherein each of the first rectifier device, the second rectifier device, the first multi-mode switch and the second multi-mode switch has a current inflow node and a current outflow node; wherein the bridge rectifier circuit is configured as (A) or (B): (A) the current outflow nodes of the first rectifier device and the second rectifier device being connected to each other at the rectified output node; the current inflow nodes of the first multi-mode switch and the second multi-mode switch being connected to each other at the ground node; the current inflow node of the first rectifier device and the current outflow node of the first multi-mode switch being connected to each other at the negative resonant output node; and the current inflow node of the second rectifier device and the current outflow node of the second multi-mode switch being connected to each other at the positive resonant output node; or (B) the current outflow nodes of the first multi-mode switch and the second multi-mode switch being connected to each other at the rectified output node; the current inflow nodes of the first rectifier device and the second rectifier device being connected to each other at the ground node; the current inflow node of the first multi-mode switch and the current outflow node of the first rectifier device being connected to each other at the negative resonant output node; and the current inflow node of the second multi-mode switch and the current outflow node of the second rectifier device being connected to each other at the positive resonant output node; wherein the step of converting the AC resonant signal to generate a rectified output signal further includes: controlling the first and the second multi-mode switches by the multi-mode switch control signal, such that the first and the second multi-mode switches operate in a time-divided combination of any two or more among a Synchronous Rectifying Switching Operation, a Resonance Short Circuit Operation, and an OSOC (One Synchronous-rectifying-switching, One Conductive Operation) Operation to regulate the rectified output voltage at a level corresponding to a level the output voltage reference signal, and/or to regulate the rectified output current at a level corresponding to a level of the output current reference signal.

In one embodiment, the step of converting the AC resonant signal to generate a rectified output signal further includes: controlling the first and the second multi-mode switches by the multi-mode switch control signal to operate in the Resonance Short Circuit Operation so as to limit a level of the AC resonant signal when the level of the rectified output voltage is larger than the rectified output voltage threshold and/or when the level of the rectified output current is larger than the rectified output current threshold, such that the level of the rectified output voltage is limited to be not larger than the rectified output voltage threshold, and/or the level of the rectified output current is limited to be not larger than the rectified output current threshold.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
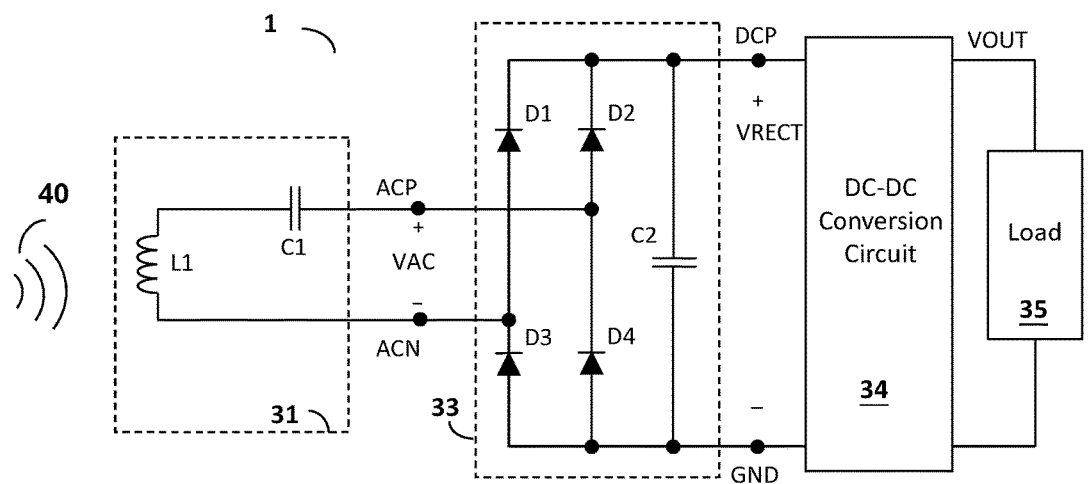
FIG. 1 shows a schematic diagram of a prior art resonant wireless power receiver circuit and the related circuits thereof.
Figure 2:
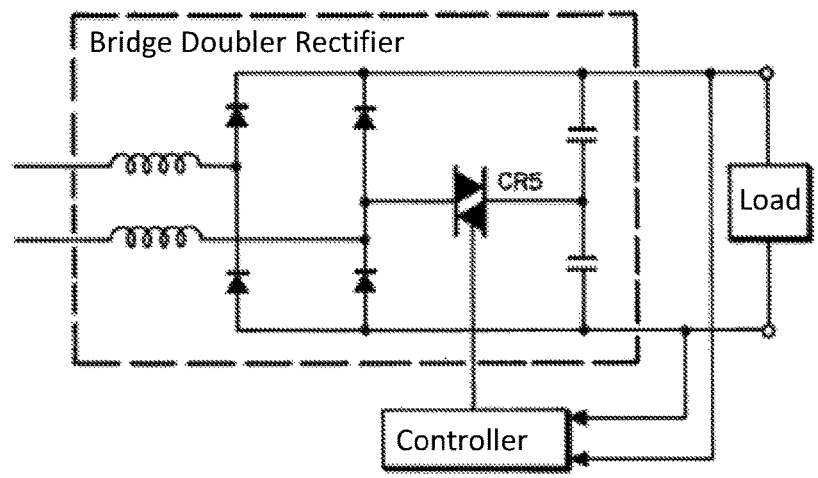
FIG. 2 shows a schematic diagram of a prior art bridge-doubler rectifier.
Figure 3:
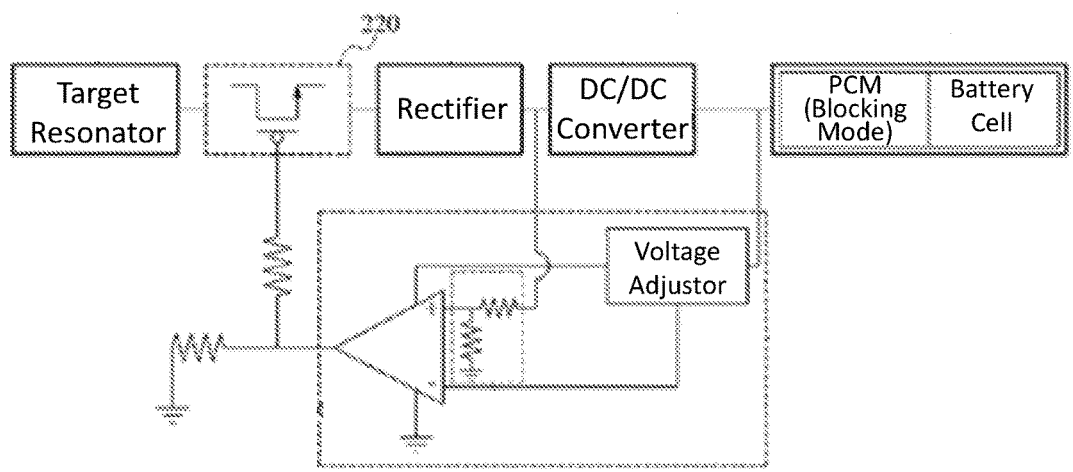
FIG. 3 shows a block diagram of a prior art resonant wireless power receiver circuit.
Figure 4:
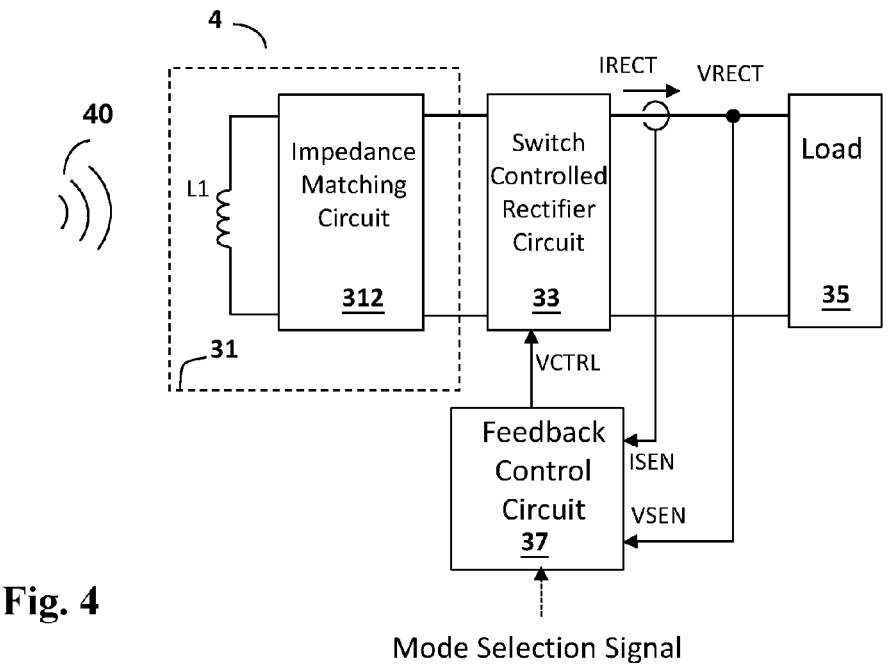
FIG. 4 shows a block diagram of an embodiment of the resonant wireless power receiver circuit according to the present invention.

FIG. 4 shows one embodiment of the resonant wireless power receiver circuit according to the present invention (resonant wireless power receiver circuit 4). The resonant wireless power receiver circuit 4 comprises a resonant circuit 31 which includes a receiver coil L1 and an impedance matching circuit 312, a switch controlled rectifier circuit 33 coupled to the resonant circuit 31, and a load 35 coupled to the switch controlled rectifier circuit 33.

The wireless power transmission is achieved as thus. In FIG. 4, a resonant wireless power transmitter circuit (not shown) transmits a wireless power 40 to a wireless field (for example but not limited to a magnetic field, an electric field or an electromagnetic field). The wireless power 40 in the wireless field is received by the resonant wireless power receiver circuit 4 with the resonance effect of the resonant circuit 31 through for example but not limited to coupling, induced by, or capturing the wireless power 40 in the wireless field. An AC resonant signal is generated between a positive resonant output node ACP and a negative resonant output node ACN of the resonant circuit 31 (referring to FIG. 5), wherein the AC resonant signal includes an AC resonant voltage VAC. The switch controlled rectifier circuit 33 rectifies the resonant voltage VAC to generate a rectified output signal which includes a rectified output voltage VRECT and a rectified output current IRECT for driving the load 35.

The switch controlled rectifier circuit 33 includes a multi-mode switch circuit which includes one or more multi-mode switches. In FIG. 4, the resonant wireless power receiver circuit 4 further includes a feedback control circuit 37 which is coupled to the switch controlled rectifier circuit 33 and is configured to generate a multi-mode switch control signal VCTRL for controlling the one or more multi-mode switches of the switch controlled rectifier circuit 33 according to a feedback signal (for example but not limited to a voltage feedback signal VSEN related to the rectified output voltage VRECT and/or a current feedback signal ISEN related to the rectified output current IRECT). In addition to rectifying the resonant voltage VAC, the switch controlled rectifier circuit 33 can also be controlled such that the one or more multi-mode switches of the multi-mode switch circuit operate at least in a portion of time in a Resonance Short Circuit Operation to limit the level of the rectified output voltage VRECT not larger than a rectified output voltage threshold, and/or to limit the level of the rectified output current IRECT not larger than a rectified output current threshold, and/or to regulate the rectified output voltage VRECT at a level corresponding to an output voltage reference signal, and/or to regulate the rectified output current IRECT at a level corresponding to an output current reference signal. The "Resonance Short Circuit Operation" means that the one or more switches in the multi-mode switch circuit are controlled to be conductive such that the positive resonant output node ACP and the negative resonant output node ACN are short-circuited to limit the level of the AC resonant signal, so as to limit or regulate the rectified output voltage VRECT and/or the rectified output current IRECT to thereby overcome the drawbacks of the aforementioned prior art circuits. Details of this and other operations will be explained later. That "the positive resonant output node ACP and the negative resonant output node ACN are short-circuited" means that, by conducting the one or more multi-mode switches of the multi-mode switch circuit, the voltage difference between the positive resonant output node ACP and the negative resonant output node ACN becomes as low as possible, but due to the inherent resistances of the wiring and of the one or more switches, the voltage difference between the positive resonant output node ACP and the negative resonant output node CAN may not be perfectly zero.

Figure 5:
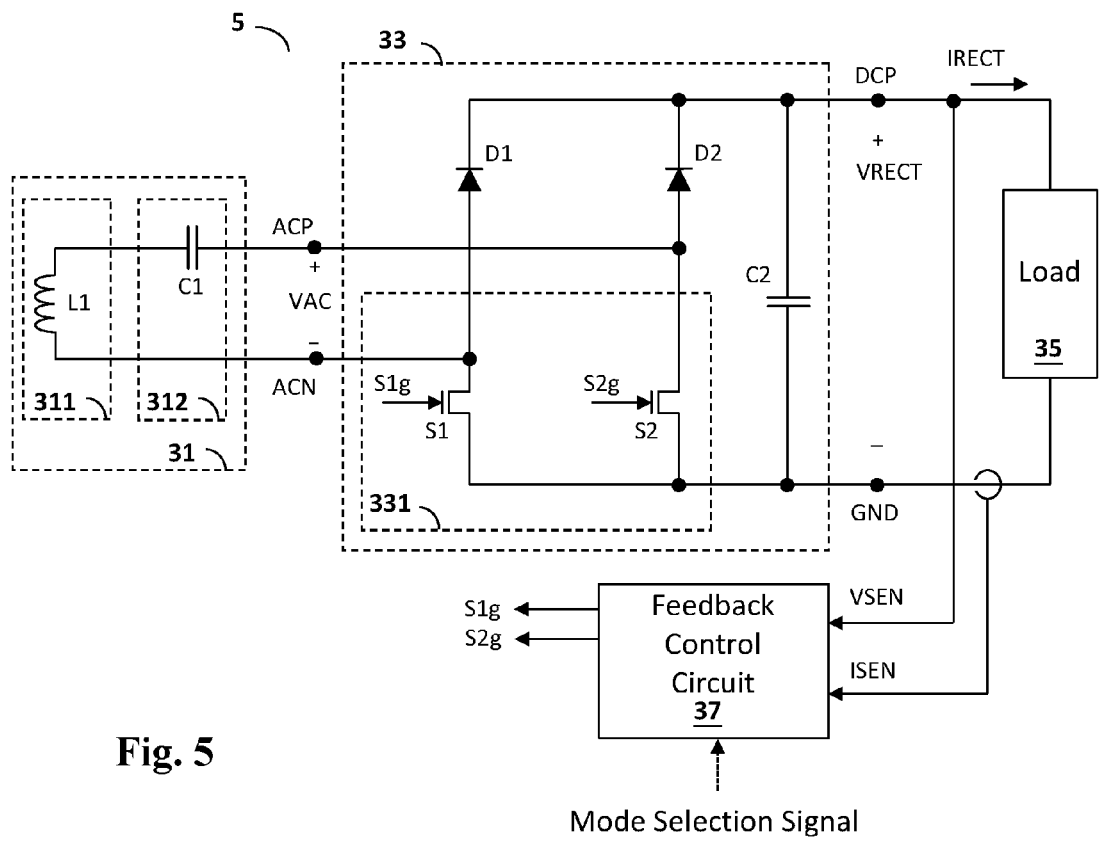
FIG. 5 shows a block diagram of a specific embodiment of the resonant wireless power receiver circuit according to the present invention.

FIG. 5 shows a more specific embodiment of the resonant wireless power receiver circuit according to the present invention (resonant wireless power receiver circuit 5). The resonant wireless power receiver circuit 5 comprises a resonant circuit 31, a switch controlled rectifier circuit 33 and a feedback control circuit 37. The resonant circuit 31 includes a receiver circuit 311 and an impedance matching circuit 312, wherein the receiver circuit 311 includes a receiver coil L1 and the impedance matching circuit 312 includes at least one impedance matching capacitor C1. The resonant circuit 31 receives a wireless power to generate an AC resonant signal between a positive resonant output node ACP and a negative resonant output node ACN, wherein the AC resonant signal includes an AC resonant voltage VAC. The switch controlled rectifier circuit 33 rectifies and filters the AC resonant voltage VAC to generate a rectified output signal between a rectified output node DCP and a ground node GND for driving the load 35, thus achieving the wireless power transmission, wherein the rectified output signal includes a rectified output voltage VRECT and a rectified output current IRECT. The impedance matching capacitor C1 for example is connected in series between the receiver circuit 311 and the switch controlled rectifier circuit 33. (Other embodiments of the impedance matching circuit 312 will be described later.)

The switch controlled rectifier circuit 33 in this embodiment includes abridge rectifier which includes at least four rectifier devices. The bridge rectifier includes diodes D1 and D2, and a multi-mode switch circuit 331 which includes multi-mode switches S1 and S2 (D1, D2, S1 and S2 are the four rectifier devices, and the bridge rectifier is controllable by operating the multi-mode switches S1 and S2). The cathodes of the diodes D1 and D2 are connected to each other at a rectified output node DCP. The current inflow nodes of the multi-mode switches S1 and S2 are connected to each other at a ground node GND. The anode of the diode D1 and the current outflow node of the multi-mode switch S1 are connected to each other at the negative resonant output node ACN, and the anode of the diode D2 and the current outflow node of the multi-mode switch S2 are connected to each other at the positive resonant output node ACP.

The feedback control circuit 37 is coupled to the switch controlled rectifier circuit 33 and is configured to generate multi-mode switch control signals S1$g$ and S2$g$ for controlling the multi-mode switches S1 and S2 of the multi-mode switch circuit 331 according to a feedback signal (for example but not limited to a voltage feedback signal VSEN related to the rectified output voltage and/or a current feedback signal ISEN related to the rectified output current), wherein S1$g$ and S2$g$ correspond to the aforementioned multi-mode switch control signal VCTRL, i.e. the multi-mode switch control signal VCTRL includes one or plural control signals whose number corresponds to the number of the multi-mode switch(es) within the switch controlled rectifier circuit 33, i.e. SNg, wherein N=1, 2, 3 . . . , which correspond to the multi-mode switches SN, wherein N=1, 2, 3 . . . , wherein N is a natural number and corresponds to the number of the multi-mode switches. This embodiment can achieve various operation modes, including a Resonant AC Signal Limit Mode, a Rectifier Output Regulation Mode, a 1× Rectifier Mode, and a 2× Rectifier Mode, which will be explained in detail below.

Referring to FIG. 5, in one embodiment, the resonant wireless power receiver circuit 5 operates in the 1× Rectifier Mode. The feedback control circuit 37 generates the multi-mode switch control signals S1g and S2g for controlling the multi-mode switches S1 and S2 to operate in a Synchronous Rectifying Switching Operation according to the AC resonant voltage VAC and the rectified output voltage VRECT. The "Synchronous Rectifying Switching Operation" means that the multi-mode switches are controlled to be conductive respectively when their respective voltage level of the current inflow node is higher than the voltage level of the outflow node by a forward voltage difference, and not conductive respectively when their respective voltage level of the current inflow node is not higher than the voltage level of the outflow node by a forward voltage difference, wherein the forward voltage difference is preferably higher than 0V. In this operation, the resonant wireless power receiver circuit 5 operates similarly to a conventional bridge rectifier, which can rectify the AC resonant voltage VAC to generate a rectified output signal between a rectified output node DCP and a ground node GND. The rectified output signal includes a rectified output voltage VRECT and a rectified output current IRECT, wherein the voltage level of the rectified output voltage VRECT is substantially the same (i.e. 1×) as an amplitude of the AC resonant voltage VAC, thus achieving the 1× Rectifier Mode. Note that although a 1× voltage is preferred, however due to non-idealities caused by for example imperfect matching among components or by the aforementioned forward voltage difference, the actual voltage level of the rectified output voltage VRECT may be close to but not exactly 1×, i.e. not exactly the same as the amplitude of the AC resonant voltage, so "substantially the same" in the context of the present invention does not require "exactly the same".

In one embodiment, each of the multi-switches (for example but not limited to the aforementioned multi-mode switches S1 and S2) may be a semiconductor switch, for example but not limited to a MOSFET switch. When the multi-mode switches S1 and S2 are semiconductor switches, the aforementioned Synchronous Rectifying Switching Operation may also be performed by controlling the multi-mode switches S1 and/or S2 to be not conductive. Since a semiconductor switch (e.g. MOSFET switch) inherently has a parasitic body diode, the multi-mode switches S1 and/or S2 can still function for rectification even when they are not conductive if the parasitic body diode is in a proper direction, i.e., the anode of the parasitic body diode is connected to the current inflow node of the corresponding multi-mode switch and the cathode of the parasitic body diode is connected to the current outflow node of the corresponding multi-mode switch.

Referring to FIG. 5, in one embodiment, the resonant wireless power receiver circuit 5 operates in the AC Resonant Signal Limiting Mode. The feedback control circuit 37 generates the multi-mode switch control signals S1g and S2g for controlling the multi-mode switches S1 and S2 to operate in the Resonance Short Circuit Operation (in the case wherein the switch controlled rectifier circuit 33 includes a bridge rectifier, the "Resonance Short Circuit Operation" is to control the multi-mode switches S1 and S2 to be concurrently conductive), such that the positive resonant output node ACP and the negative resonant output node ACN are short-circuited to limit the voltage difference between the positive resonant output node ACP and the negative resonant output node ACN. In addition, the short-circuit between ACP and ACN will cause the reflection impedance of the resonant wireless power transmitter circuit (not shown) to increase, which will decrease the power received by the resonant circuit 31, and hence the current through the multi-mode switches S1 and S2 are limited. When the multi-mode switches S1 and S2 operate in the Resonance Short Circuit Operation, the power consumption by the load 35 will decrease the rectified output voltage VRECT, and this feature can be applied for Over Voltage Protection in one embodiment, or for regulating the rectified output voltage VRECT and/or the rectified output current IRECT in another embodiment. Details of these operations will be explained later.

Figure 6A:
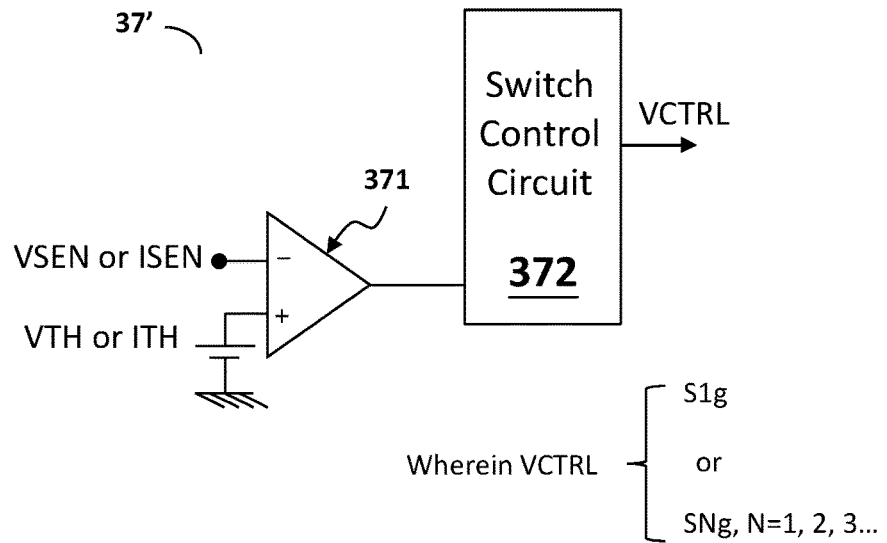
FIGS. 6A-6B show block diagrams of embodiments of the feedback control circuit of the resonant wireless power receiver circuit according to the present invention.

FIG. 6A shows a more specific embodiment of the feedback control circuit (feedback control circuit 37') which can be used as the feedback control circuit 37 in FIG. 4 or 5. The feedback control circuit 37' includes a comparing circuit 371 and a switch control circuit 372, wherein the comparing circuit 371 compares the voltage feedback signal VSEN related to the rectified output voltage VRECT or the current feedback signal ISEN related to the rectified output current IRECT to a threshold reference signal VTH which relates to the rectified output voltage threshold or a threshold reference signal ITH which relates to the rectified output current threshold. The switch control circuit 372 generates the multi-mode switch control signals S1g and S2g to control the multi-mode switches S1 and S2 (such as S1 and S2 in FIG. 5) according to the aforementioned comparing result, such that the multi-mode switches S1 and S2 operate in the Resonance Short Circuit Operation when the voltage level of the rectified output voltage VRECT is larger than the rectified output voltage threshold and/or when the current level of the rectified output current IRECT is larger than the rectified output current threshold, whereby the level of the AC resonant signal is limited to achieve the AC Resonance Signal Limiting Mode, which can realize for example Over Voltage Protection, Over Current Protection, Voltage Clamping, or Current Clamping.

Figure 6B:
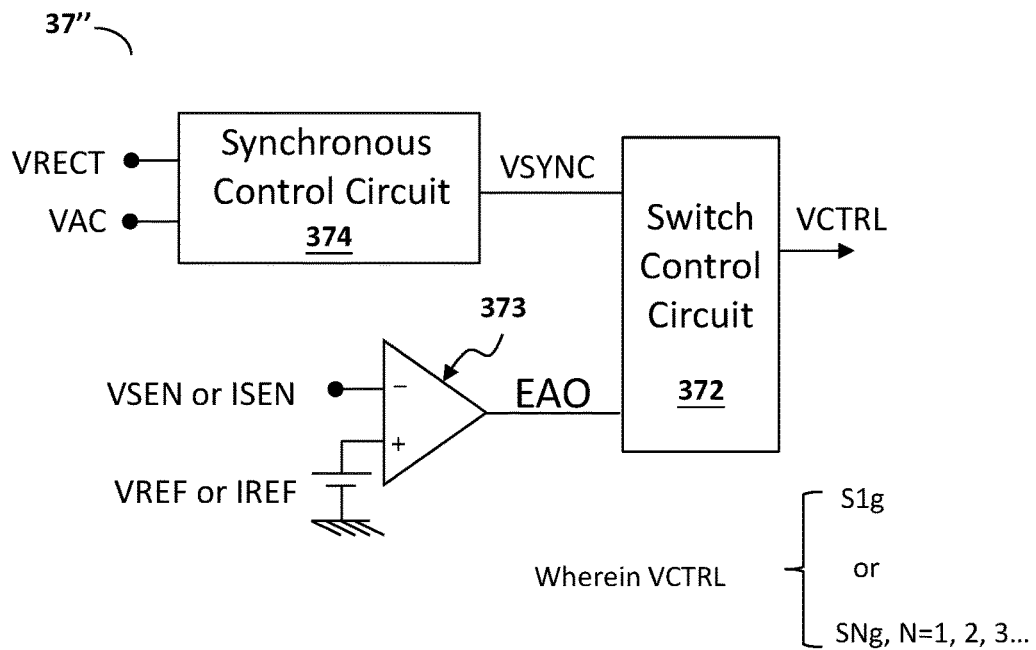

Referring to FIGS. 5 and 6B, in one embodiment, the resonant wireless power receiver circuit 5 can operate in the Rectifier Output Regulation Mode. FIG. 6B shows a more specific embodiment of the feedback control circuit (feedback control circuit 37") which can be used as the feedback control circuit 37 in FIG. 4 or 5. The feedback control circuit 37" includes an error feedback circuit 373, a synchronous control circuit 374, and a switch control circuit 372. The error feedback circuit 373 generates an error feedback signal EAO according to a difference between an output voltage reference signal VREF and the voltage feedback signal VSEN related to the rectified output voltage VRECT, or a difference between an output current reference signal IREF and the current feedback signal ISEN related to the rectified output current IRECT. The synchronous control circuit 374 generates a synchronous control signal VSYNC according to the rectified output signal and the AC resonant signal. The switch control circuit 372 generates the multi-mode switch control signals S1g and S2g to control the multi-mode switches S1 and S2 (such as S1 and S2 in FIG. 5) according to the error feedback signal EAO and the synchronous control signal VSYNC, such that the multi-mode switches S1 and S2 operate in a time-divided combination of the Synchronous Rectifying Switching Operation and the Resonance Short Circuit Operation to regulate the rectified output voltage VRECT corresponding to the output voltage reference signal VREF, and/or to regulate the rectified output current IRECT corresponding to the output current reference signal IREF. Thus, the Rectifier Output Regulation Mode is achieved.

The term "time-divided combination" means that in one cycle period, two or more different operations are performed, sharing the time of the cycle period. More specifically, the "time-divided combination of the Synchronous Rectifying Switching Operation and the Resonance Short Circuit Operation" means that the multi-mode switches S1 and S2 are controlled to operate, and switch between the Synchronous Rectifying Switching Operation and the Resonance Short Circuit Operation within a cycle period. For example, referring to the waveforms shown in FIG. 7A, the cycle period TPER includes time periods T1 and T2, wherein both time periods T1 and T2 are smaller than TPER and larger or equal to zero, and the multi-mode switches S1 and S2 are controlled to operate in the Synchronous Rectifying Switching Operation during the time period T1 and in the Resonance Short Circuit Operation during the time period T2, which is the so-called "time-divided combination", and such "time-divided combination" repeats periodically.

Note that the sequence of the time periods T1 and T2 in the cycle period TPER is only an example and can be modified. The cycle period TPER may be a pre-determined fixed length of time or an adjustable length of time. The cycle period TPER can be, but is not limited to being generated by an oscillator; or, one or more oscillators may be used to generate fixed or variable time periods T1 and/or T2, and the cycle period TPER can be a sum of the time periods T1 and T2. Thus, the cycle period TPER may be a pre-determined fixed or variable time period, or a time period which is determined according to the time periods T1 and T2. Furthermore, the "time-divided combination" can be applied to any two or more operations, not limited to the time-divided combination of the Synchronous Rectifying Switching Operation and the Resonance Short Circuit Operation.

Referring to FIG. 5, in one embodiment, the resonant wireless power receiver circuit 5 can operate in the 2× Rectifier Mode, wherein the impedance matching capacitor C1 is a resonance capacitor connected in series with the receiver circuit 311 and in series with the switch controlled rectifier circuit 33. The feedback control circuit 37 generates the multi-mode switch control signals S1g and S2g for controlling the multi-mode switches S1 and S2 to operate in a One Synchronous-rectifying-switching/One Conductive Operation (abbreviated as "OSOC Operation" in the context of this specification) according to the AC resonant signal and the rectified output signal (the AC resonant voltage VAC and the rectified output voltage VRECT in this embodiment). The "OSOC Operation" means that the feedback control circuit 37 controls one of the multi-mode switches S1 and S2 to operate in the Synchronous Rectifying Switching Operation, while controls the other one of the multi-mode switches S1 and S2 to be conductive. In OSOC operation, the resonant wireless power receiver circuit 5 rectifies the AC resonant voltage VAC to generate the rectified output signal between the rectified output node DCP and the ground node GND, wherein the rectified output signal includes the rectified output voltage VRECT and the rectified output current IRECT, and the voltage level of the rectified output voltage VRECT is substantially twice (i.e. 2×) the amplitude of the AC resonant voltage, thus achieving the 2× Rectifier Mode. Note that although a 2× voltage is preferred, however due to non-idealities caused by for example imperfect matching among components or by the aforementioned forward voltage difference, the actual voltage level of the rectified output voltage VRECT may be close to but not exactly 2×, i.e. not exactly twice the amplitude of the AC resonant voltage, so "substantially twice" in the context of the present invention does not require "exactly twice".

Referring to FIGS. 5 and 6B, in one embodiment, the "Rectifier Output Regulation Mode" of the resonant wireless power receiver circuit 5 according to the present invention can further include combinations of the OSOC operation and one or more other aforementioned operations, such that the rectified output voltage VRECT and/or the rectified output current IRECT can be regulated at a very wide range of target levels. In one embodiment, the feedback control circuit 37" in FIG. 6B generates the multi-mode switch control signals S1g and S2g to control the multi-mode switches S1 and S2 (such as S1 and S2 in FIG. 5) such that the multi-mode switches S1 and S2 operate in a time-divided combination of any two or more among the Synchronous Rectifying Switching Operation, the Resonance Short Circuit Operation, and the OSOC Operation, to regulate the rectified output voltage VRECT at a level corresponding to the output voltage reference signal VREF (i.e. to regulate the voltage feedback signal VSEN such that it corresponds to the voltage reference signal VREF), and/or to regulate the rectified output current IRECT at a level corresponding to the output current reference signal IREF (i.e. to regulate the current feedback signal VSEN such that it corresponds to the current reference signal IREF). Thus, the Rectifier Output Regulation Mode is achieved.

Figure 7A:
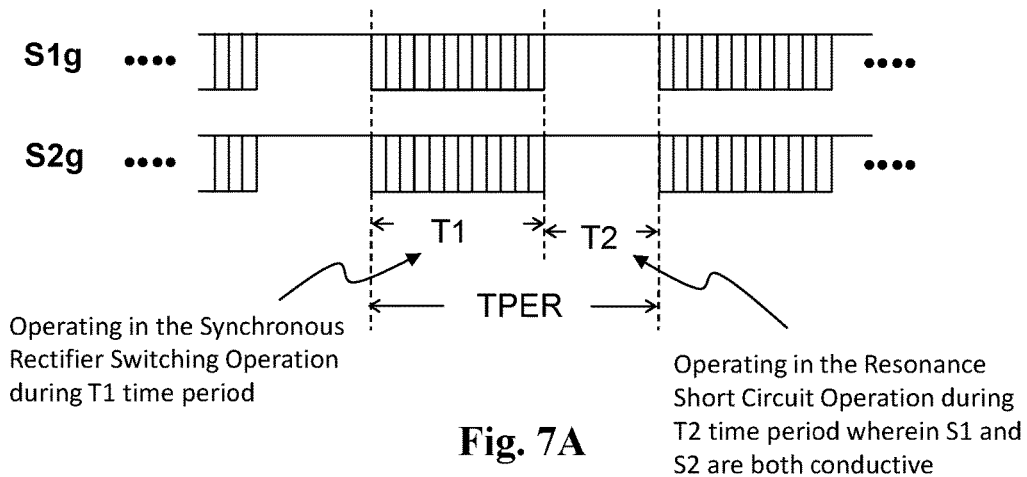
FIGS. 7A-7B show simulation waveforms of the circuit shown in FIGS. 5 and 6B.
Figure 7B:
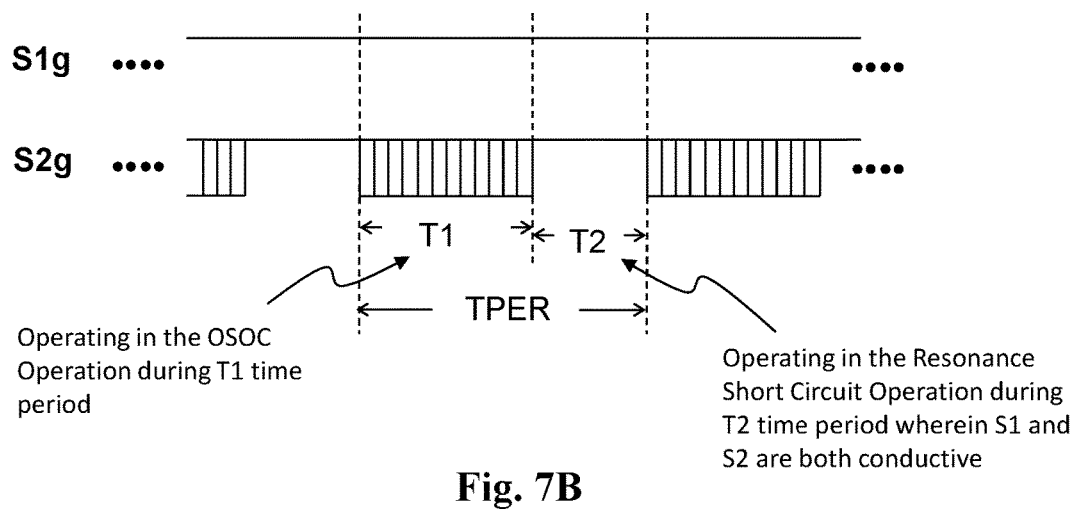

For illustration, please refer to the waveforms shown in FIG. 7B, wherein the multi-mode switches S1 and S2 are controlled to operate in the OSOC Operation during the time period T1 and in the Resonance Short Circuit Operation during the time period T2, and such time-divided combination of the OSOC Operation and the Resonance Short Circuit Operation repeats periodically. The OSOC operation in FIG. 7B is so arranged that the multi-mode switch S1 is kept conductive while the multi-mode switch S2 operates in the Synchronous Rectifying Switching Operation, but this is only an example; the operations of the multi-mode switches S1 and S2 can be interchanged. In another embodiment, there can be a time period T3 (not shown) in the cycle period TPER, and the multi-mode switches S1 and S2 operate in the OSOC Operation, the Synchronous Rectifying Switching Operation and the Resonance Short Circuit Operation during T1, T2 and T3 respectively, not limited to the described sequence, in the Rectifier Output Regulation Mode.

It should be noted that: the aforementioned "2× Rectifier Mode" does not necessarily need a closed loop feedback control; the feedback control circuit 37 can be open-loop controlled (by for example by, but not limited to, a mode selection signal which is optional) to generate the multi-mode switch control signal VCTRL for controlling the multi-mode switches to achieve the 2× Rectifier Mode. In this case, the feedback control circuit 37 does not need to receive the voltage feedback signal VSEN and the current feedback signal ISEN. And, if it is only required to perform voltage regulation in the Rectifier Output Regulation Mode, the feedback control circuit 37 does not need to receive the current feedback signal ISEN; and if it is only required to perform current regulation in the Rectifier Output Regulation Mode, the feedback control circuit 37 does not need to receive the voltage feedback signal VSEN.

Figure 8:
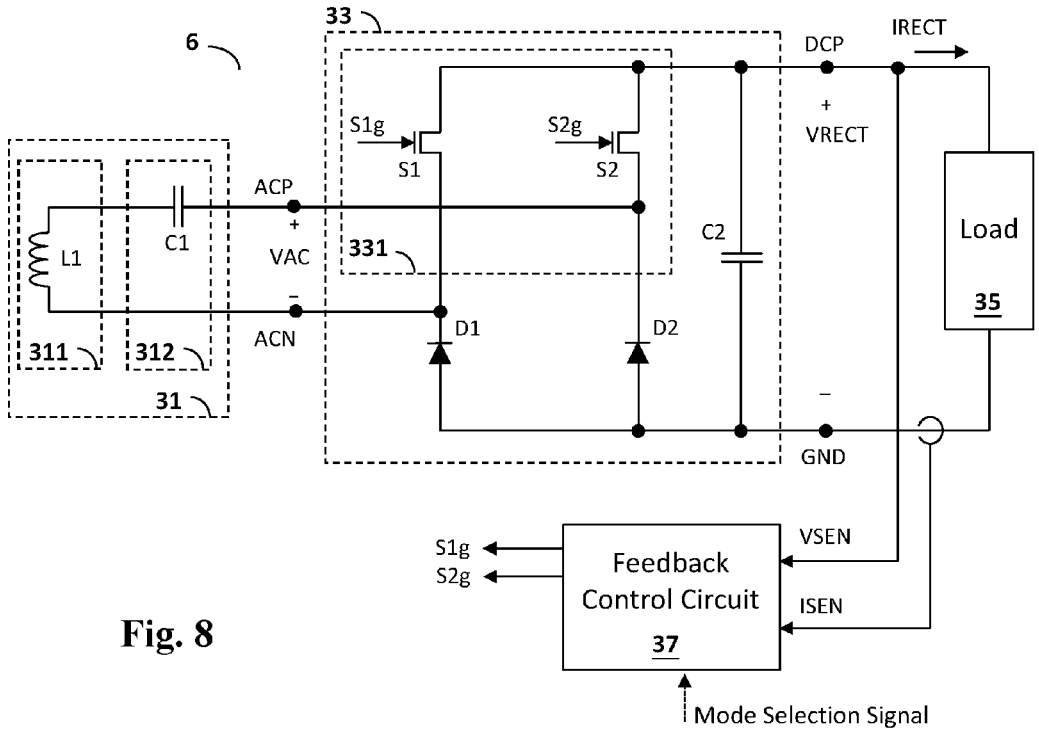
FIG. 8 shows an embodiment of the resonant wireless power receiver circuit according to the present invention.

FIG. 8 shows a more specific embodiment of the resonant wireless power receiver circuit according to the present invention (resonant wireless power receiver circuit 6). This embodiment is similar to the resonant wireless power receiver circuit 5 in FIG. 5, but is different in that the positions and coupling relationships of the multi-mode switches S1 and S2 and the diodes D1 and D2 are interchanged; the configuration shown in FIG. 8 can still achieve all the aforementioned operations. This embodiment illustrates that: the basic concept, which is an important feature of the present invention, is to provide a multi-mode switch circuit which is controllable to short-circuit the positive resonant output node and the negative resonant output node, regardless of the number and position(s) of the multi-mode switch(es) in the multi-mode switch circuit. Embodiments wherein the multi-mode switch circuit includes only one multi-mode switch will be described later with reference to FIGS. 14 and 15.

Figure 9:
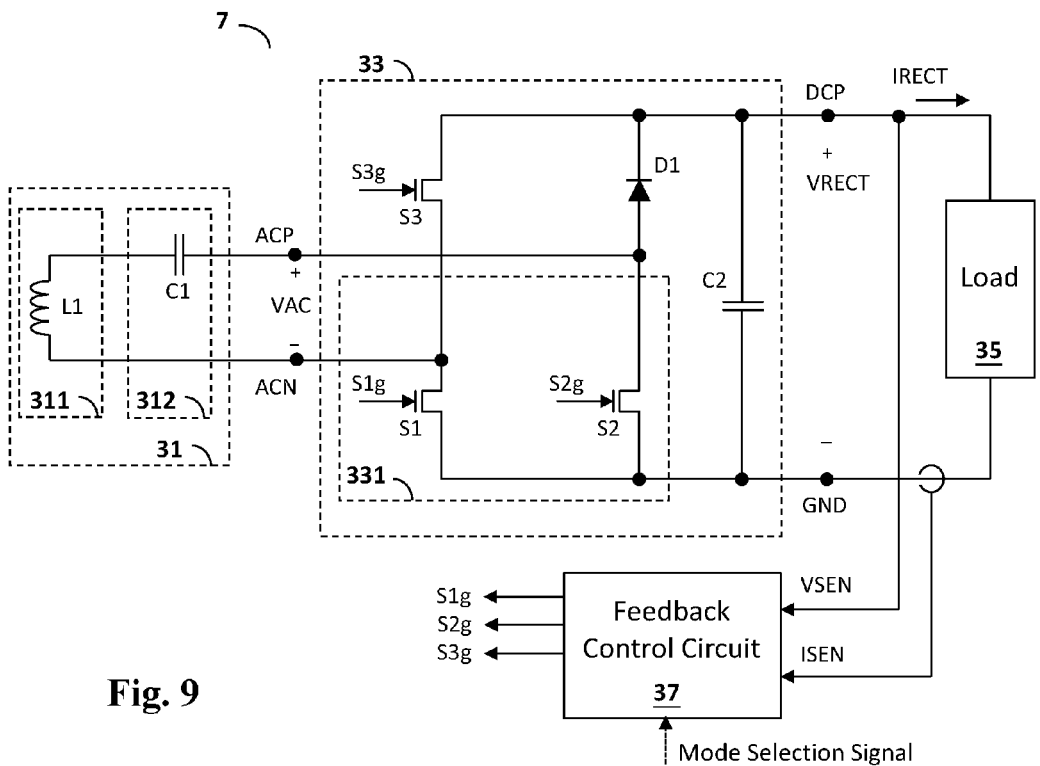
FIG. 9 shows an embodiment of the resonant wireless power receiver circuit according to the present invention.
Figure 10:
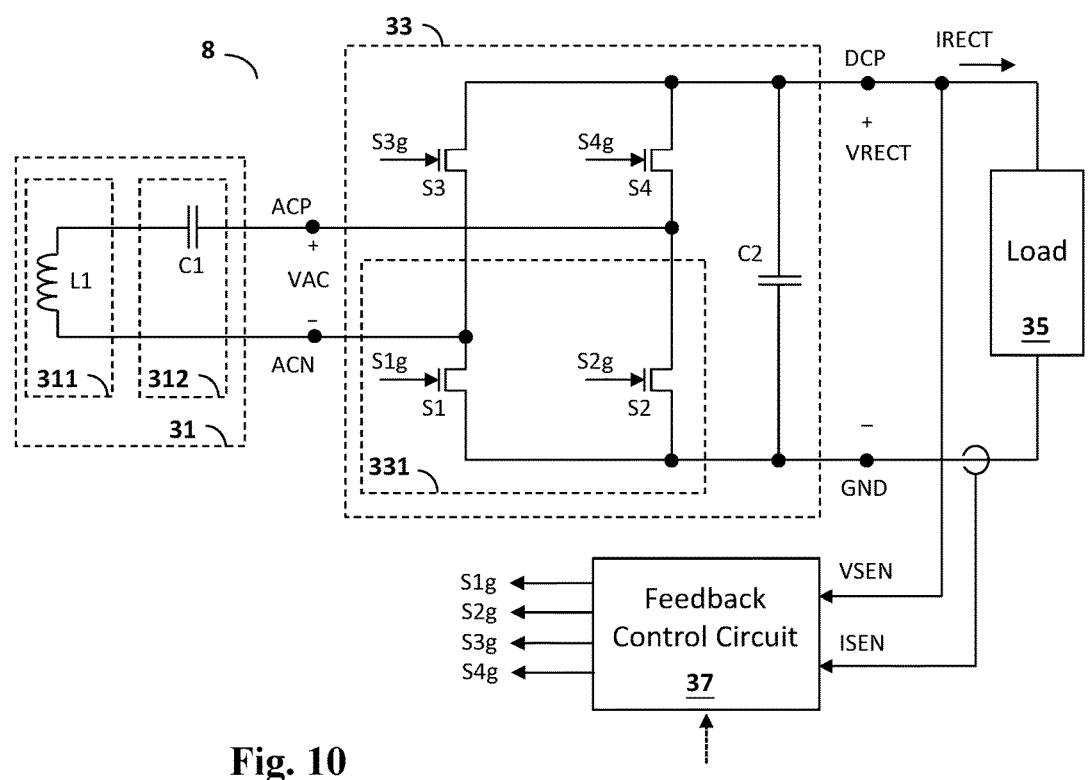
FIG. 10 shows an embodiment of the resonant wireless power receiver circuit according to the present invention.

FIGS. 9 and 10 show more specific embodiments of the resonant wireless power receiver circuit according to the present invention (resonant wireless power receiver circuit 7 and 8). The resonant wireless power receiver circuit 7 and 8 are also similar to the resonant wireless power receiver circuit 5 in FIG. 5, but are different in that one or both of the diodes D1 and D2 are replaced by the multi-mode switches, for example the multi-mode switches S3 in FIG. 9 and multi-mode switches S3 and S4 in FIG. 10. These switches are controllable by the feedback control circuit 37 to operate in all the aforementioned operations and modes.

Figure 11:
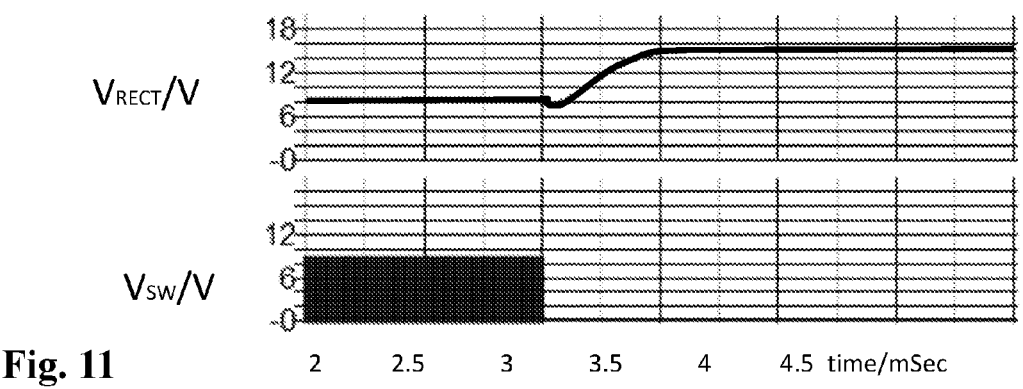
FIGS. 11-13 show simulation waveforms of the circuit shown in FIGS. 5 and 6B.

FIG. 11 shows waveforms of the resonant wireless power receiver circuit according to the present invention. As shown in the figure, before 3 mSec, the resonant wireless power receiver circuit (for example but not limited to the resonant wireless power receiver circuit 5) operates in the 1× Rectifier Mode, that is, the multi-mode switch S1 and S2 operate in the Synchronous Rectifying Switching Operation to generate the 1× rectified output voltage VRECT (for example around 8V in FIG. 11) which is substantially the same as the amplitude of the AC resonant voltage VAC (not shown). In FIG. 11, Vsw shows the waveform of the voltage difference between the current inflow node and the current outflow node of the multi-mode switch S1 or S2 when operating in the Synchronous Rectifying Switching Operation. After 3 mSec, as shown in the figure, the resonant wireless power receiver circuit 5 operates in the 2× Rectifier Mode, that is, the multi-mode switch S1 and S2 operate in the OSOC Operation, such that the rectified output voltage VRECT rises to a 2× voltage (for example around 15V in FIG. 11) which is substantially twice the amplitude of the AC resonant voltage VAC (not shown). VSW in FIG. 11 shows that one of the multi-mode switches S1 and S2 is kept conductive, and the voltage difference between its current inflow node and its current outflow node is 0V as shown in the figure.

Figure 12:
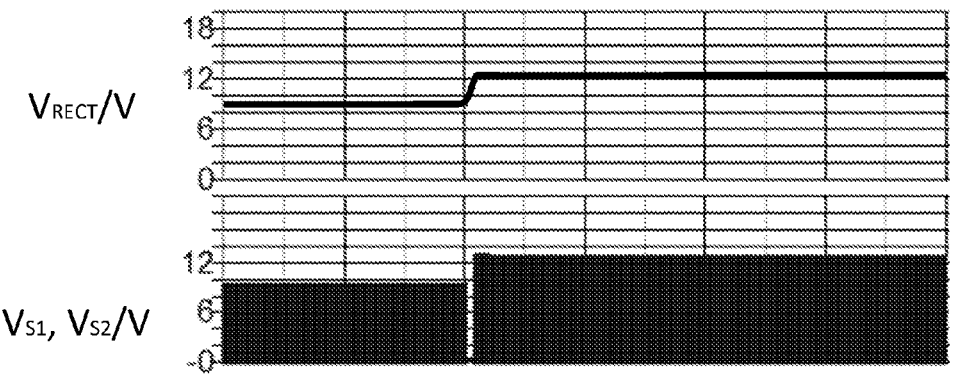

FIG. 12 shows waveforms of the resonant wireless power receiver circuit according to the present invention. As shown in FIG. 12, before 3 mSec, the resonant wireless power receiver circuit (for example but not limited to the resonant wireless power receiver circuit 5) operates in the 1× Rectifier Mode, that is, the multi-mode switch S1 and S2 operate in the Synchronous Rectifying Switching Operation to generate the 1× rectified output voltage VRECT (for example around 9V in FIG. 12) which is substantially the same as the amplitude of the AC resonant voltage VAC (not shown). The waveform VS1/VS2 in FIG. 12 shows the voltage difference between the current inflow node and the current outflow node of the multi-mode switches S1 and S2 when operating in the Synchronous Rectifying Switching Operation. After 3 mSec, as shown in the figure, the resonant wireless power receiver circuit 5 operates in the "Rectifier Output Regulation Mode", that is, the multi-mode switches S1 and S2 operate in a time-divided combination of the OSOC Operation and the Resonance Short Circuit Operation, such that the rectified output voltage VRECT rises to a target level which corresponds to an output voltage reference signal, the target level for example being around 12V as shown in FIG. 12. The waveform VS1/VS2 shows the voltage difference between the current inflow node and the current outflow node of one of the multi-mode switches S1 and S2 when operating in the time-divided combination of the OSOC Operation and the Resonance Short Circuit Operation.

Figure 13:
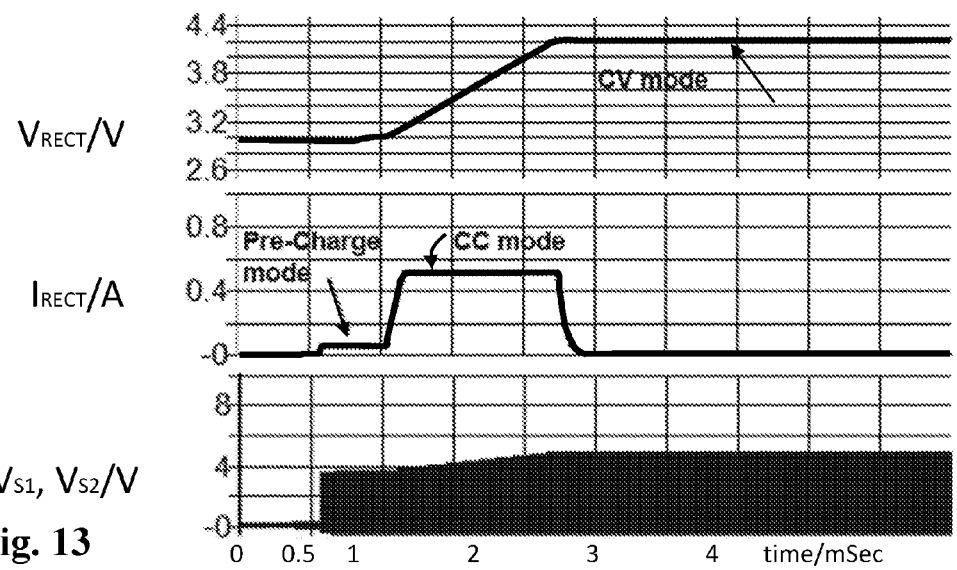

FIG. 13 shows waveforms of the resonant wireless power receiver circuit (for example but not limited to the resonant wireless power receiver circuit 5) which is applied for battery charging through the Rectifier Output Regulation Mode with various settings according to the present invention. In this embodiment, the load 35 is for example to a re-chargeable battery, and the switch controlled rectifier circuit 33 for example is a charging circuit, wherein the rectifier output current corresponds to a charging current, and the rectifier output voltage corresponds to a charging voltage. In FIG. 13, during the period of time wherein the voltage of the re-chargeable battery is lower than 3V (for example VRECT during the period from 0.5 mSec to 1 mSec in FIG. 13), the charging circuit operates in a time-divided combination of the Synchronous Rectifying Switching Operation and the Resonance Short Circuit Operation to regulate the charging current at a level corresponding to a lower rectified output current reference signal, for example a current of around 50 mA which is for example 1/10 of a pre-determined charging current, to operate in a pre-charge mode (which corresponds to the aforementioned Rectifier Output Regulation Mode for current regulation). During the period of time wherein the battery voltage is higher than 3V but lower than 4.2 V (for example during the period from 1 mSec to 2.2 mSec in FIG. 13), the charging circuit operates in a time-divided combination of the Synchronous Rectifying Switching Operation and the Resonance Short Circuit Operation to regulate the charging current at a level corresponding to a higher rectified output current reference signal, for example a pre-determined current of around 500 mA, to operate in a constant current mode (CC mode, which corresponds to the aforementioned Rectifier Output Regulation Mode for current regulation). When the battery voltage approaches 4.2 V (for example after 2.2 mSec in FIG. 13), the charging circuit operates in a time-divided combination of the Synchronous Rectifying Switching Operation and the Resonance Short Circuit Operation to regulate the charging voltage at a level corresponding to a rectified output voltage reference signal, for example a pre-determined voltage of around 4.2V, to operate in a constant voltage mode (CV mode, which corresponds to the aforementioned Rectifier Output Regulation Mode for voltage regulation); meanwhile, the charging current decreases automatically and the output voltage reaches and maintains constant. In FIG. 13, the waveform VS1/VS2 shows the voltage difference between the current inflow node and the current outflow node of the multi-mode switch S1 or S2 when operating in the aforementioned various operation modes.

Furthermore, it can be seen from the aforementioned waveforms that the voltage difference between the current inflow node and the current outflow node of the multi-mode switches S1 and S2 can be maintained at a relatively low difference, which means that the present invention allows for using switching components with a lower voltage rating.

Figure 14:
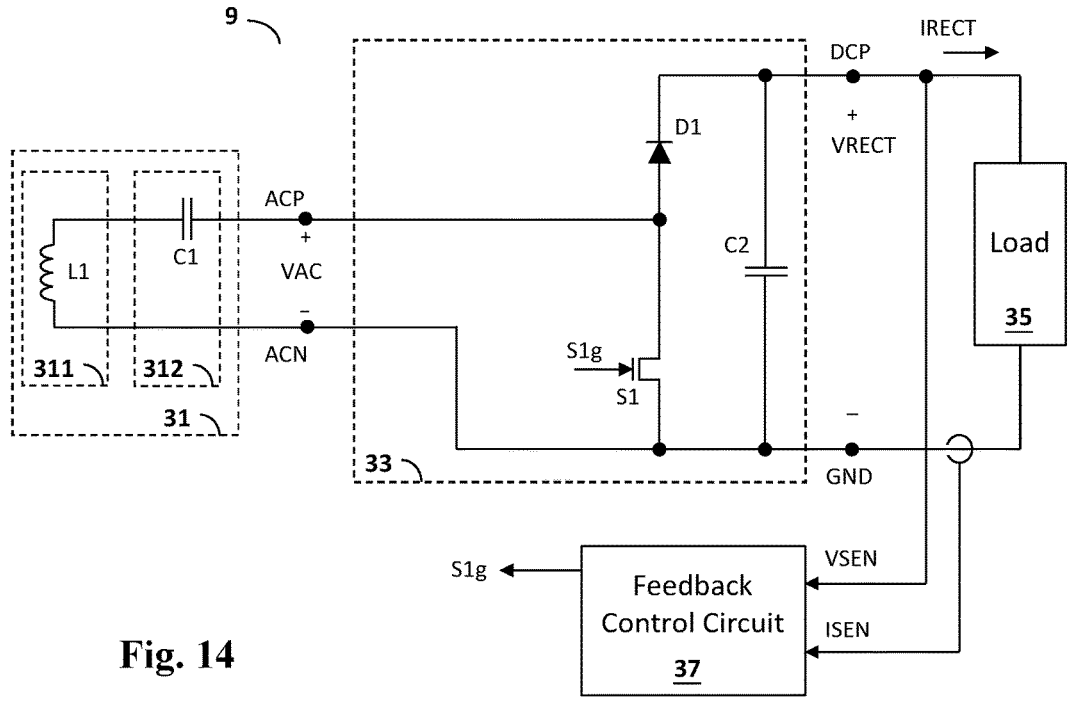
FIGS. 14-17 show several embodiments of the resonant wireless power receiver circuit according to the present invention.

FIG. 14 shows a specific embodiment of the resonant wireless power receiver circuit according to the present invention (resonant wireless power receiver circuit 9). The resonant wireless power receiver circuit 9 comprises a resonant circuit 31, a switch controlled rectifier circuit 33 and a feedback control circuit 37. The resonant circuit 31 includes a receiver circuit 311 and an impedance matching circuit 312, wherein the receiver circuit 311 includes a receiver coil L1 and the impedance matching circuit 312 includes at least one impedance matching capacitor C1. The switch controlled rectifier circuit 33 receives a wireless power to generate an AC resonant signal between a positive resonant output node ACP and a negative resonant output node ACN, wherein the AC resonant signal includes an AC resonant voltage VAC. The switch controlled rectifier circuit 33 rectifies and filters the AC resonant voltage VAC to generate a rectified output signal between a rectified output node DCP and a ground node GND for driving the load 35, thus achieving the wireless power transmission, wherein the rectified output signal includes a rectified output voltage VRECT and a rectified output current IRECT.

In this embodiment, the negative resonant output node ACN is connected to the ground node GND. The switch controlled rectifier circuit 33 in this embodiment is a rectifier with switch control, which includes at least two rectifier devices. The two rectifier devices include a multi-mode switch S1, and a diode D1. The cathode of the diode D1 is connected to the rectified output node DCP. The current inflow nodes of the multi-mode switch S1 is connected the ground node GND. The anode of the diode D1 and the current outflow node of the multi-mode switch S1 are connected to each other at the positive resonant output node ACP. The feedback control circuit 37 is coupled to the switch controlled rectifier circuit 33 and is configured to generate a multi-mode switch control signal S1g for controlling the multi-mode switch S1 according to a feedback signal (for example but not limited to a voltage feedback signal VSEN related to the rectified output voltage and/or a current feedback signal ISEN related to the rectified output current). This embodiment can achieve various operation modes, including the Resonant AC Signal Limit Mode, the Rectifier Output Regulation Mode, and the 1× Rectifier Mode.

Referring to FIG. 14, this embodiment can operate in a similar way to the aforementioned embodiments (for example the resonant wireless power receiver circuit 5 in FIG. 5). In one embodiment, the feedback control circuit 37 of the resonant wireless power receiver circuit 9 generates the multi-mode switch control signal S1g for controlling the multi-mode switch S1 to operate in the Synchronous Rectifying Switching Operation such that the resonant wireless power receiver circuit 9 can rectify the AC resonant voltage VAC to generate a rectified output signal between the rectified output node DCP and the ground node GND. The rectified output signal includes a rectified output voltage VRECT and a rectified output current IRECT, wherein the voltage level of the rectified output voltage VRECT is substantially the same (i.e. 1×) as the amplitude of the AC resonant voltage, thus achieving the 1× Rectifier Mode.

Referring to FIG. 14, in one embodiment, the resonant wireless power receiver circuit 9 operates in the AC Resonant Signal Limiting Mode. The feedback control circuit 37 generates a multi-mode switch control signal S1g for controlling the multi-mode switch S1 to operate in a Resonance Short Circuit Operation (i.e. the multi-mode switch S1 is conductive), such that the positive resonant output node ACP and the negative resonant output node ACN are short-circuited to limit the voltage level between the positive resonant output node ACP and the negative resonant output node ACN. In addition, the short circuit between ACP and ACN will cause the reflection impedance of the resonant wireless power transmitter circuit (not shown) to increase, which will decrease the power received by the resonant circuit 31, and hence the current of multi-mode switch S1 is limited. When the multi-mode switch S1 operates in the Resonance Short Circuit Operation (S1 being conductive), the power consumption of the load 35 will decrease the rectified output voltage VRECT, and this feature can be applied for Over Voltage Protection in one embodiment or to regulate the rectified output voltage VRECT and/or the rectified output current IRECT in another embodiment.

FIG. 6A shows a more specific embodiment of the feedback control circuit (feedback control circuit 37') which can be used as the feedback control circuit 37 in FIG. 14. The feedback control circuit 37' includes a comparing circuit 371 and a switch control circuit 372, wherein the comparing circuit 371 compares the voltage feedback signal VSEN related to the rectified output voltage VRECT or the current feedback signal ISEN related to the rectified output current IRECT to a threshold reference signal VTH which relate to the rectified output voltage threshold or a threshold reference signal ITH which relate to the rectified output current threshold. The switch control circuit 372 generates the multi-mode switch control signal S1g to control the multi-mode switch S1 according to the aforementioned comparing result, such that the multi-mode switch S1 operates in the Resonance Short Circuit Operation when the voltage level of the rectified output voltage VRECT is larger than the rectified output voltage threshold and/or when the current level of the rectified output current IRECT is larger than the rectified output current threshold, whereby the level of the AC resonant signal is limited to achieve the AC Resonance Signal Limiting Mode, which can realize for example Over Voltage Protection, Over Current Protection, Voltage Clamping, or Current Clamping.

Referring to FIGS. 14 and 6B, in one embodiment, the resonant wireless power receiver circuit 9 can operate in the Rectifier Output Regulation Mode. FIG. 6B shows a more specific embodiment of the feedback control circuit (feedback control circuit 37") which can be used as the feedback control circuit 37 in FIG. 14. The feedback control circuit 37" includes an error feedback circuit 373, a synchronous control circuit 374, and a switch control circuit 372. The error feedback circuit 373 generates an error feedback signal EAO according to a difference between the output voltage reference signal VREF and the voltage feedback signal VSEN related to the rectified output voltage VRECT, or a difference between the output current reference signal IREF and the current feedback signal ISEN related to the rectified output current IRECT. The synchronous control circuit 374 generates a synchronous control signal VSYNC according to the rectified output signal and the AC resonant signal. The switch control circuit 372 generates the multi-mode switch control signal Slg to control the multi-mode switch S1 (such as S1 in FIG. 14) according to the aforementioned error feedback signal EAO and the synchronous control signal VSYNC, such that the multi-mode switch S1 operates in a time-divided combination of the Synchronous Rectifying Switching Operation and the Resonance Short Circuit Operation to regulate the rectified output voltage VRECT at a level corresponding to an output voltage reference signal VREF, and/or to regulate the rectified output current IRECT at a level corresponding to an output current reference signal IREF. Thus, the Rectifier Output Regulation Mode is achieved. The waveform of the multi-mode switch control signal S1g for example can be as shown in FIG. 7A.

Similar to the embodiment of FIG. 8, the positions and coupling relationships of the multi-mode switch S1 and the diode D1 in the embodiment of FIG. 14 can be interchanged, with corresponding amendments of the configuration of the circuitry. In one embodiment, for example, the current inflow node of the multi-mode switch S1 and the current outflow node of the diode D1 are connected to each other at the positive resonant output node ACP; the current outflow node of the multi-mode switch S1 is connected to the rectified output node DCP; the current inflow node of the diode D1 is connected to the ground node GND; and the negative resonant output node ACN is connected to the rectified output node DCP.

Figure 15:
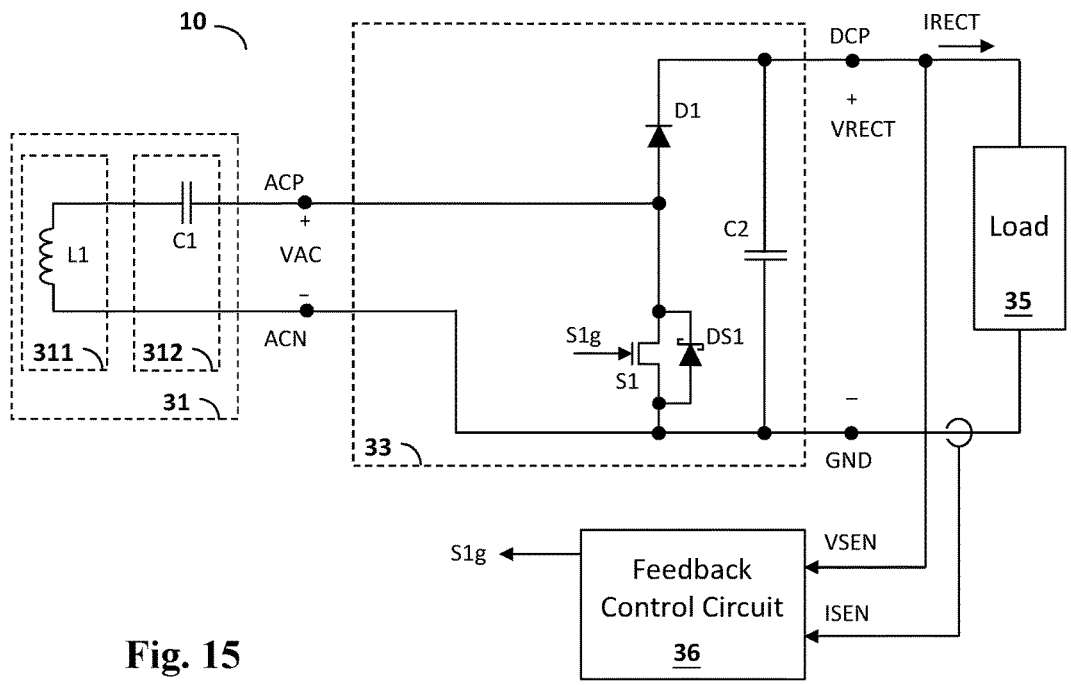
Figure 16:
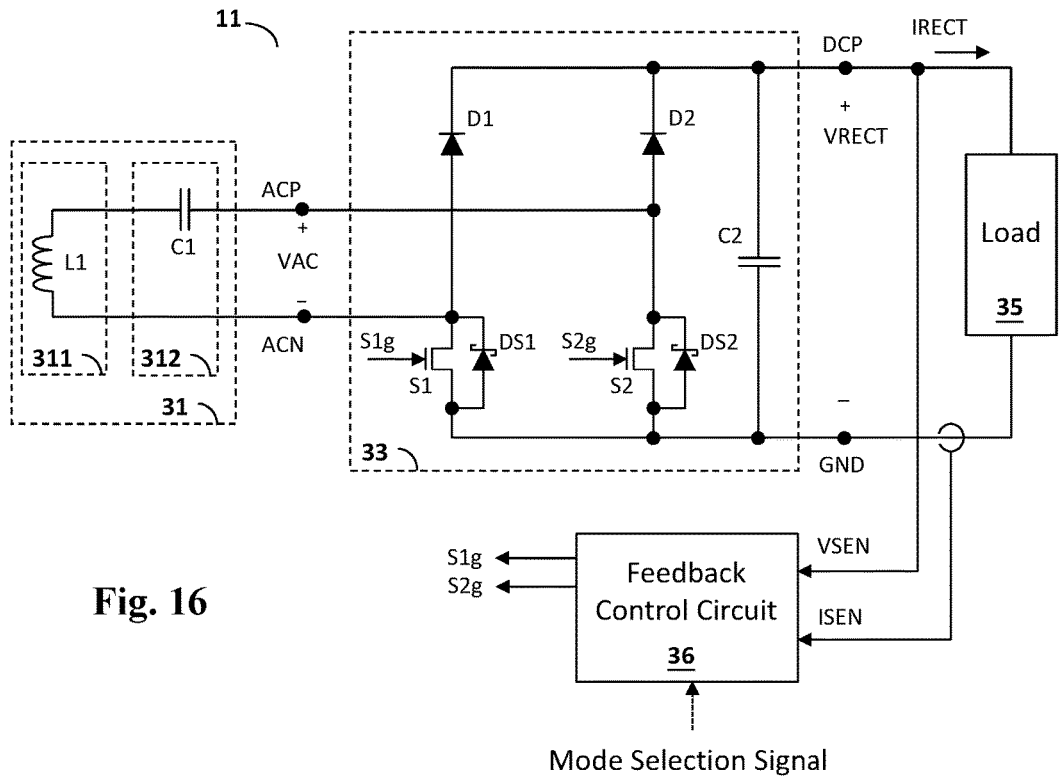

FIGS. 15 and 16 show embodiments of the resonant wireless power receiver circuit according to the present invention, wherein each of the multi-mode switches (for example the multi-mode switches S1 and S2 of the resonant wireless power receiver circuit 10 or 11, and likewise for other multi-mode switches in the aforementioned embodiments) may be further connected in parallel with a bypass diode (for example DS1 in FIG. 15 and DS1 and DS2 in FIG. 16). The bypass diode preferably has a low forward voltage, such as a Schottky diode, so as to reduce the power loss caused by the forward voltage drop.

Figure 17:
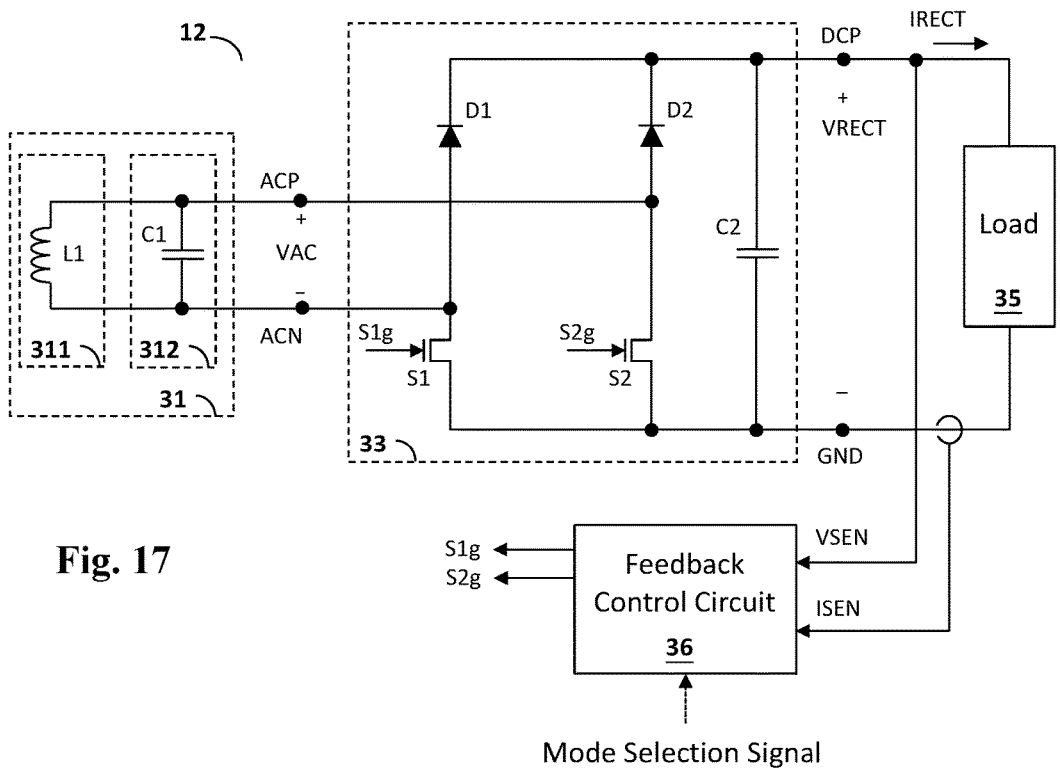

In the wireless power receiver circuit according to the present invention, the impedance matching circuit 312 is not limited to including only one capacitor connected in series as shown in the above embodiments. The impedance matching circuit 312 can include a capacitor connected in parallel, or two or more capacitors connected in parallel, in series, or in a combination of parallel and series. For example, FIG. 17 shows one embodiment in which the switching control rectifier circuit 33 operates with a resonant capacitor connected in parallel (as shown by C1 in FIG. 17), and those skilled in this art can readily conceive variations of two or more capacitors connected in parallel, in series, or in a combination of parallel and series, or variations wherein the impedance matching circuit 312 can include combinations of resistors, inductors, capacitors and semiconductor devices. In certain applications, the impedance matching circuit can be omitted.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. As an example, the "Rectifier Output Regulation Mode" and the "Resonant AC Signal Limit Mode" can be used together, such that the level of the rectified output voltage or the rectified output current can not only be regulated corresponding to the level of the output reference signal but also be not higher than a rectified output threshold. In this case, the feedback control circuit should be correspondingly configured, as a combination of the aforementioned corresponding embodiments, to realize the combination of modes as mentioned above. As another example, when operating in the "Rectifier Output Regulation Mode", the rectified output voltage and the rectified output current can be regulated at the same time or in a time-divided manner, such that the rectified output voltage and the rectified output current are regulated according to their respective reference levels. Furthermore, those skilled in this art can readily conceive variations and modifications within the spirit of the present invention. For example, the diodes used as the rectifier devices in the embodiments can be replaced by Shottky diodes. As another example, in the embodiment of the switch controlled rectified circuit 33 in FIG. 10, the Resonance Short Circuit Operation or the OSOC Operation can be achieved by operating the multi-mode switches S3 and S4, instead of the multi-mode switches S1 and S2; or by operating the multi-mode switches S1 and S2 in one of the aforementioned operations and operating the multi-mode switches S3 and S4 in another operation. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A resonant wireless power receiver circuit, comprising:
   a resonant circuit which includes a receiver coil, configured to operably receive a wireless power to generate an AC resonant signal between a positive resonant output node and a negative resonant output node, wherein the AC resonant signal includes an AC resonant voltage, and the AC resonant voltage has an amplitude;
   a switch controlled rectifier circuit, configured to operably convert the AC resonant signal to generate a rectified output signal between a rectified output node and a ground node, wherein the rectified output signal includes a rectified output voltage and a rectified output current, wherein the switch controlled rectifier circuit includes a multi-mode switch circuit which includes at least one multi-mode switch; and
   a feedback control circuit, configured to operably generate a multi-mode switch control signal for controlling the multi-mode switch circuit according to a voltage feedback signal related to the rectified output voltage and/or a current feedback signal related to the rectified output current, such that the multi-mode switch circuit operates at least in a portion of time in a Resonance Short Circuit Operation to limit a level of the rectified output voltage not larger than a rectified output voltage threshold, and/or to limit a level of the rectified output current not larger than a rectified output current threshold, and/or to regulate the rectified output voltage at a level corresponding to a level of an output voltage reference signal, and/or to regulate the rectified output current at a level corresponding to a level of an output current reference signal;
   wherein in the "Resonance Short Circuit Operation", the multi-mode switch circuit operates such that the positive resonant output node and the negative resonant output node are short-circuited.

2. The resonant wireless power receiver circuit of claim 1, wherein the switch controlled rectifier circuit includes a bridge rectifier circuit which includes a first rectifier device, a second rectifier device, and the multi-mode switch circuit, wherein the multi-mode switch circuit includes a first multi-mode switch and a second multi-mode switch, wherein each of the first rectifier device, the second rectifier device, the first multi-mode switch and the second multi-mode switch has a current inflow node and a current outflow node;

wherein the bridge rectifier circuit is configured as (A) or (B):
(A) the current outflow nodes of the first rectifier device and the second rectifier device being connected to each other at the rectified output node; the current inflow nodes of the first multi-mode switch and the second multi-mode switch being connected to each other at the ground node; the current inflow node of the first rectifier device and the current outflow node of the first multi-mode switch being connected to each other at the negative resonant output node; and the current inflow node of the second rectifier device and the current outflow node of the second multi-mode switch being connected to each other at the positive resonant output node; or
(B) the current outflow nodes of the first multi-mode switch and the second multi-mode switch being connected to each other at the rectified output node; the current inflow nodes of the first rectifier device and the second rectifier device being connected to each other at the ground node; the current inflow node of the first multi-mode switch and the current outflow node of the first rectifier device being connected to each other at the negative resonant output node; and the current inflow node of the second multi-mode switch and the current outflow node of the second rectifier device being connected to each other at the positive resonant output node;

wherein the feedback control circuit controls the first and the second multi-mode switches by the multi-mode switch control signal, such that the first and the second multi-mode switches operate in a time-divided combination of any two or more among a Synchronous Rectifying Switching Operation, a Resonance Short Circuit Operation, and an OSOC (One Synchronous-rectifying-switching, One Conductive Operation) Operation to regulate the rectified output voltage at the level corresponding to the level of the output voltage reference signal, and/or to regulate the rectified output current at the level corresponding to the level of the output current reference signal.

3. The resonant wireless power receiver circuit of claim 2, wherein the switch control circuit is configured to operably control the first and the second multi-mode switches by the multi-mode switch control signal to operate in the Resonance Short Circuit Operation so as to limit a level of the AC resonant signal when the level of the rectified output voltage is larger than the rectified output voltage threshold and/or when the level of the rectified output current is larger than the rectified output current threshold, such that the level of the rectified output voltage is limited to be not larger than the rectified output voltage threshold, and/or the level of the rectified output current is limited to be not larger than the rectified output current threshold.

4. The resonant wireless power receiver circuit of claim 1, wherein the resonant circuit further includes an impedance matching circuit which includes one impedance matching capacitor coupled to the receiver coil in series or in parallel, or which includes two or more impedance matching capacitors coupled in series, or in parallel, or in a combination of parallel and series, and the two or more impedance matching capacitors being coupled to the receiver coil.

5. The resonant wireless power receiver circuit of claim 2, wherein the first rectifier device and the second rectifier device are configured as (A), (B), or (C):
(A) each of the first rectifier device and the second rectifier device including a diode, wherein the anodes and the cathodes of the diodes correspond to the current inflow nodes and the current outflow nodes of the first rectifier device and the second rectifier device respectively;
(B) the first rectifier device including a third multi-mode switch and the second rectifier device including a forth multi-mode switch, wherein the feedback control circuit controls the third multi-mode switch and the forth multi-mode switch by the multi-mode switch control signal to operate in the Synchronous Rectifying Switching Operation; or
(C) the first rectifier device and the second rectifier device being a combination of a diode and a third multi-mode switch, wherein the anode and the cathode of the diode correspond to the current inflow node and the current outflow node of the first rectifier device or the second rectifier device, and the feedback control circuit controls the third multi-mode switch by the multi-mode switch control signal to operate in the Synchronous Rectifying Switching Operation.

6. The resonant wireless power receiver circuit of claim 1, wherein each of the first and the second multi-mode switches includes a semiconductor switch.

7. The resonant wireless power receiver circuit of claim 1, wherein the bridge rectifier circuit further includes a first bypass diode and a second bypass diode, the first and the second multi-mode switches being connected to the first and the second bypass diode in parallel respectively.

8. The resonant wireless power receiver circuit of claim 1, wherein the switch controlled rectifier circuit further includes a rectifier device, and each of the rectifier device and the multi-mode switch has a current inflow node and a current outflow node;

wherein the multi-mode switch and the rectifier device are configured as (A) or (B):
(A) the current outflow node of the multi-mode switch and the current inflow node of the rectifier device being connected to each other at the positive resonant output node, the current inflow node of the multi-mode switch being connected to the negative resonant output node, the current outflow node of the rectifier device being connected to the rectified output node, and the negative resonant output node being connected to the ground node; or
(B) the current inflow node of the multi-mode switch and the current outflow node of the rectifier device being connected to each other at the positive resonant output node, the current outflow node of the multi-mode switch being connected to the rectified output node, the current inflow node of the rectifier device being connected to the ground node, the negative resonant output node being connected to the rectified output node;

wherein the feedback control circuit controls the multi-mode switch by the multi-mode switch control signal, such that the multi-mode switch operate in a time-divided combination of a Synchronous Rectifying Switching Operation and a Resonance Short Circuit Operation to regulate the rectified output voltage at the level corresponding to the level the output voltage reference signal, and/or to regulate the rectified output current at the level corresponding to the level of the output current reference signal.

9. The resonant wireless power receiver circuit of claim 8, wherein the switch control circuit is configured to operably control the multi-mode switch by the multi-mode switch control signal to operate in the Resonance Short Circuit Operation so as to limit a level of the AC resonant signal when the voltage level of the rectified output voltage is larger than the rectified output voltage threshold and/or when the current level of the rectified output current is larger than the rectified output current threshold, such that the level of the rectified output voltage is limited to be not larger than the rectified output voltage threshold, and/or the level of the rectified output current is limited to be not larger than the rectified output current threshold.

10. The resonant wireless power receiver circuit of claim 8, wherein the resonant circuit further includes an impedance matching circuit which includes one impedance matching capacitor coupled to the receiver coil in series or in parallel, or which includes two or more impedance matching capacitors coupled in series, or in parallel, or in a combination of parallel and series, and the two or more impedance matching capacitors being coupled to the receiver coil.

11. The resonant wireless power receiver circuit of claim 8, wherein the rectifier device is configured as (A) or (B):
  (A) the rectifier device including a diode, wherein the anode and the cathode of the diode correspond to the current inflow node and the current outflow node of the rectifier device respectively; or
  (B) the rectifier device includes another multi-mode switch, wherein the feedback control circuit controls this another multi-mode switch by the multi-mode switch control signal to operate in the Synchronous Rectifying Switching Operation.

12. The resonant wireless power receiver circuit of claim 8, wherein the multi-mode switch includes a semiconductor switch.

13. The resonant wireless power receiver circuit of claim 8, wherein the switch controlled rectifier circuit further includes a bypass diode connected to the multi-mode switch in parallel.

14. A feedback control circuit, configured to operably control a resonant wireless power receiver circuit which comprises: a resonant circuit which includes a receiver coil, configured to operably receive a wireless power to generate an AC resonant signal between a positive resonant output node and a negative resonant output node, wherein the AC resonant signal includes an AC resonant voltage, and the AC resonant voltage has an amplitude; and a bridge rectifier circuit, configured to operably convert the AC resonant signal to generate a rectified output signal between a rectified output node and a ground node, wherein the rectified output signal includes a rectified output voltage and a rectified output current, wherein the bridge rectifier circuit includes a first rectifier device, a second rectifier device, and a multi-mode switch circuit which includes a first multi-mode switch and a second multi-mode switch, wherein each of the first rectifier device, the second rectifier device, the first multi-mode switch and the second multi-mode switch has a current inflow node and a current outflow node; wherein the bridge rectifier circuit is configured as (A) or (B): (A) the current outflow nodes of the first rectifier device and the second rectifier device being connected to each other at the rectified output node; the current inflow nodes of the first multi-mode switch and the second multi-mode switch being connected to each other at the ground node; the current inflow node of the first rectifier device and the current outflow node of the first multi-mode switch being connected to each other at the negative resonant output node; and the current inflow node of the second rectifier device and the current outflow node of the second multi-mode switch being connected to each other at the positive resonant output node; or (B) the current outflow nodes of the first multi-mode switch and the second multi-mode switch being connected to each other at the rectified output node; the current inflow nodes of the first rectifier device and the second rectifier device being connected to each other at the ground node; the current inflow node of the first multi-mode switch and the current outflow node of the first rectifier device being connected to each other at the negative resonant output node; and the current inflow node of the second multi-mode switch and the current outflow node of the second rectifier device being connected to each other at the positive resonant output node; the feedback control circuit includes:
  an error feedback circuit, configured to operably generate a voltage error feedback signal according to a voltage feedback signal related to the rectified output voltage and/or to generate a current error feedback signal according to a current feedback signal related to the rectified output current;
  a synchronous control circuit, configured to operably generate a synchronous control signal according to the rectified output signal and the AC resonant signal; and
  a switch control circuit, configured to operably generate a multi-mode switch control signal for controlling the multi-mode switch circuit according to the voltage error feedback signal and/or the current error feedback signal such that the multi-mode switch circuit operates in a time-divided combination of any two or more among a Synchronous Rectifying Switching Operation, a Resonance Short Circuit Operation, and an OSOC (One Synchronous-rectifying-switching, One Conductive Operation) Operation to regulate the rectified output voltage to a level corresponding to a level of the output voltage reference signal, and/or to regulate the rectified output current to a level corresponding to a level of the output current reference signal;
  wherein in the "Resonance Short Circuit Operation", the multi-mode switch circuit operates such that the positive resonant output node and the negative resonant output node are short-circuited.

15. The feedback control circuit of claim 14, wherein the resonant circuit further includes an impedance matching circuit which includes one impedance matching capacitor coupled to the receiver coil in series or in parallel, or which includes two or more impedance matching capacitors coupled in series, or in parallel, or in a combination of parallel and series, and the two or more impedance matching capacitors being coupled to the receiver coil.

16. The feedback control circuit of claim 14, wherein the first rectifier device and the second rectifier device are configured as (A), (B), or (C):
  (A) each of the first rectifier device and the second rectifier device including a diode respectively, wherein the anodes and the cathodes of the diodes correspond to the current inflow nodes and the current outflow nodes of the first rectifier device and the second rectifier device respectively;
  (B) the first rectifier device and the second rectifier device including a third multi-mode switch and a forth multi-mode switch, respectively, wherein the feedback control circuit controls the third multi-mode switch and the forth multi-mode switch by the multi-mode switch control signal to operate in the Synchronous Rectifying Switching Operation; or (C) the first rectifier device and the second rectifier device being a combination of a diode and a third multi-mode switch, wherein the anode and the cathode of the diode correspond to the current inflow node and the current outflow node of the first rectifier device or the second rectifier device, and the feedback control circuit controls the third multi-mode switch by the multi-mode switch control signal to operate in the Synchronous Rectifying Switching Operation.

17. The feedback control circuit of claim 14, wherein each of the first and the second multi-mode switches includes a semiconductor switch.

18. The feedback control circuit of claim 14, wherein the bridge rectifier circuit further includes a first bypass diode and a second bypass diode, and the first and the second multi-mode switches are connected to the first and the second bypass diode in parallel respectively.

19. A feedback control circuit, configured to operably control a resonant wireless power receiver circuit which comprises: a resonant circuit which includes a receiver coil, configured to operably receive a wireless power to generate an AC resonant signal between a positive resonant output node and a negative resonant output node, wherein the AC resonant signal includes an AC resonant voltage, and the AC resonant voltage has an amplitude; and a bridge rectifier circuit, configured to operably convert the AC resonant signal to generate a rectified output signal between a rectified output node and a ground node, wherein the rectified output signal includes a rectified output voltage and a rectified output current, wherein the bridge rectifier circuit includes a first rectifier device, a second rectifier device, and a multi-mode switch circuit which includes a first multi-mode switch and a second multi-mode switch, wherein each of the first rectifier device, the second rectifier device, the first multi-mode switch and the second multi-mode switch has a current inflow node and a current outflow node; wherein the bridge rectifier circuit is configured as (A) or (B): (A) the current outflow nodes of the first rectifier device and the second rectifier device are connected to each other at the rectified output node; the current inflow nodes of the first multi-mode switch and the second multi-mode switch being connected to each other at the ground node; the current inflow node of the first rectifier device and the current outflow node of the first multi-mode switch being connected to each other at the negative resonant output node; and the current inflow node of the second rectifier device and the current outflow node of the second multi-mode switch being connected to each other at the positive resonant output node; or (B) the current outflow nodes of the first multi-mode switch and the second multi-mode switch being connected to each other at the rectified output node; the current inflow nodes of the first rectifier device and the second rectifier device being connected to each other at the ground node; the current inflow node of the first multi-mode switch and the current outflow node of the first rectifier device being connected to each other at the negative resonant output node; and the current inflow node of the second multi-mode switch and the current outflow node of the second rectifier device being connected to each other at the positive resonant output node; the feedback control circuit includes:

a threshold determination circuit which includes a comparing circuit, configured to operably generate a threshold determination signal by comparing the rectified output voltage with a rectified output voltage threshold or by comparing the rectified output current with a rectified output current threshold; and a switch control circuit, configured to operably generate a multi-mode switch control signal for controlling the multi-mode switch circuit according to the threshold determination signal such that the multi-mode switch circuit operates in the Resonance Short Circuit Operation so as to limit a level of the AC resonant signal, and such that a level of the rectified output voltage is limited to be not larger than the rectified output voltage threshold, and/or a level of the rectified output current is limited to be not larger than the rectified output current threshold;

wherein in the "Resonance Short Circuit Operation", the multi-mode switch circuit operates such that the positive resonant output node and the negative resonant output node are short-circuited.

20. The feedback control circuit of claim 19, wherein the first rectifier device and the second rectifier device are configured as (A), (B), or (C):

(A) each of the first rectifier device and the second rectifier device including a diode respectively, wherein the anodes and the cathodes of the diodes correspond to the current inflow nodes and the current outflow nodes of the first rectifier device and the second rectifier device respectively;

(B) the first rectifier device and the second rectifier device including a third multi-mode switch and a forth multi-mode switch, respectively, wherein the feedback control circuit controls the third multi-mode switch and the forth multi-mode switch by the multi-mode switch control signal to operate in the Synchronous Rectifying Switching Operation; or (C) the first rectifier device and the second rectifier device being a combination of a diode and a third multi-mode switch, wherein the anode and the cathode of the diode correspond to the current inflow node and the current outflow node of the first rectifier device or the second rectifier device, and the feedback control circuit controls the third multi-mode switch by the multi-mode switch control signal to operate in the Synchronous Rectifying Switching Operation.

21. A feedback control circuit, configured to operably control a resonant wireless power receiver circuit which comprises: a resonant circuit which includes a receiver coil, configured to operably receive a wireless power to generate an AC resonant signal between a positive resonant output node and a negative resonant output node, wherein the AC resonant signal includes an AC resonant voltage, and the AC resonant voltage has an amplitude; and a switch controlled rectifier circuit, configured to operably convert the AC resonant signal to generate a rectified output signal between a rectified output node and a ground node, wherein the rectified output signal includes a rectified output voltage and a rectified output current, wherein the switch controlled rectifier circuit includes a rectifier device and a multi-mode switch, wherein each of the rectifier device and the multi-mode switch has a current inflow node and a current outflow node; wherein the switch controlled rectifier circuit is configured as (A) or (B): (A) the current outflow node of the multi-mode switch and the current inflow node of the rectifier device being connected to each other at the positive resonant output node, the current inflow node of the multi-mode switch being connected to the negative resonant output node, the current outflow node of the rectifier device being connected to the rectified output node, and the negative resonant output node being connected to the ground node; or (B) the current inflow node of the multi-mode switch and the current outflow node of the rectifier device being connected to each other at the positive resonant output node, the current outflow node of the multi-mode switch being connected to the rectified output node, the current inflow node of the rectifier device being connected to the ground node, the negative resonant output node being connected to the rectified output node; the feedback control circuit includes:

an error feedback circuit, configured to operably generate a voltage error feedback signal according to a voltage feedback signal related to the rectified output voltage and/or to generate a current error feedback signal according to a current feedback signal related to the rectified output current;

a synchronous control circuit, configured to operably generate a synchronous control signal according to the rectified output signal and the AC resonant signal; and a switch control circuit, configured to operably generate a multi-mode switch control signal for controlling the multi-mode switch according to the voltage error feedback signal and/or the current error feedback signal such that the multi-mode switch operates in a time-divided combination of a Synchronous Rectifying Switching Operation and a Resonance Short Circuit Operation to regulate a level of the rectified output voltage corresponding to a level the output voltage reference signal, and/or to regulate a level of the rectified output current corresponding to a level of the output current reference signal;

wherein in the "Resonance Short Circuit Operation", the multi-mode switch operates such that the positive resonant output node and the negative resonant output node are short-circuited.

22. The feedback control circuit of claim 21, wherein the resonant circuit further includes an impedance matching circuit which includes one impedance matching capacitor coupled to the receiver coil in series or in parallel, or which includes two or more impedance matching capacitors coupled in series, or in parallel, or in a combination of parallel and series, and the two or more impedance matching capacitors being coupled to the receiver coil.

23. The feedback control circuit of claim 21, wherein the rectifier device is configured as (A) or (B):

(A) the rectifier device including a diode, wherein the anode and the cathode of the diode correspond to the current inflow node and the current outflow node of the rectifier device respectively; or (B) the rectifier device including another multi-mode switch, wherein the feedback control circuit controls this another multi-mode switch by the multi-mode switch control signal to operate in the Synchronous Rectifying Switching Operation.

24. The feedback control circuit of claim 21, wherein the multi-mode switch includes a semiconductor switch.

25. The feedback control circuit of claim 21, wherein the switch controlled rectifier circuit further includes a bypass diode connected to the multi-mode switch in parallel.

26. A feedback control circuit, configured to operably control a resonant wireless power receiver circuit which comprises: a resonant circuit which includes a receiver coil, configured to operably receive a wireless power to generate an AC resonant signal between a positive resonant output node and a negative resonant output node, wherein the AC resonant signal includes an AC resonant voltage, and the AC resonant voltage has an amplitude; and a switch controlled rectifier circuit, configured to operably convert the AC resonant signal to generate a rectified output signal between a rectified output node and a ground node, wherein the rectified output signal includes a rectified output voltage and a rectified output current, wherein the switch controlled rectifier circuit includes a rectifier device and a multi-mode switch, wherein each of the rectifier device and the multi-mode switch has a current inflow node and a current outflow node; wherein the switch controlled rectifier circuit is configured as (A) or (B): (A) the current outflow node of the multi-mode switch and the current inflow node of the rectifier device being connected to each other at the positive resonant output node, the current inflow node of the multi-mode switch being connected to the negative resonant output node, the current outflow node of the rectifier device being connected to the rectified output node, and the negative resonant output node being connected to the ground node; or (B) the current inflow node of the multi-mode switch and the current outflow node of the rectifier device being connected to each other at the positive resonant output node, the current outflow node of the multi-mode switch being connected to the rectified output node, the current inflow node of the rectifier device being connected to the ground node, the negative resonant output node being connected to the rectified output node; the feedback control circuit includes:

a threshold determination circuit which includes a comparing circuit, configured to operably generate a threshold determination signal by comparing the rectified output voltage with a rectified output voltage threshold or by comparing the rectified output current with a rectified output current threshold; and a switch control circuit, configured to operably generate a multi-mode switch control signal for controlling the multi-mode switch according to the threshold determination signal such that the multi-mode switch operates in the Resonance Short Circuit Operation so as to limit a level of the AC resonant signal, and such that a level of the rectified output voltage is limited to be not larger than the rectified output voltage threshold, and/or a level of the rectified output current is limited to be not larger than the rectified output current threshold;

wherein in the "Resonance Short Circuit Operation", the multi-mode switch operates such that the positive resonant output node and the negative resonant output node are short-circuited.

27. The feedback control circuit of claim 26, wherein the rectifier device is configured as (A) or (B):

(A) the rectifier device including a diode, wherein the anode and the cathode of the diode correspond to the current inflow node and the current outflow node of the rectifier device respectively; or (B) the rectifier device including another multi-mode switch, wherein the feedback control circuit controls this another multi-mode switch by the multi-mode switch control signal to operate in the Synchronous Rectifying Switching Operation.

28. A resonant wireless power conversion method, wherein a resonant circuit receives a wireless power and generate an AC resonant signal between a positive resonant output node and a negative resonant output node, wherein the AC resonant signal includes an AC resonant voltage, and the AC resonant voltage has an amplitude; the resonant wireless power conversion method includes:

controlling a switch controlled rectifier circuit to convert the AC resonant signal to generate a rectified output signal between a rectified output node and a ground node, wherein the rectified output signal includes a rectified output voltage and a rectified output current, wherein the switch controlled rectifier circuit includes a multi-mode switch circuit which includes at least one multi-mode switch; and generating a multi-mode switch control signal for controlling the multi-mode switch circuit according to a voltage feedback signal related to the rectified output voltage and/or a current feedback signal related to the rectified output current, such that the multi-mode switch circuit operates at least in a portion of time in a Resonance Short Circuit Operation to limit a level of the rectified output voltage not larger than a rectified output voltage threshold, and/or to limit a level of the rectified output current not larger than a rectified output current threshold, and/or to regulate the rectified output voltage at a level corresponding to a level of an output voltage reference signal, and/or to regulate the rectified output current at a level corresponding to a level of an output current reference signal;

wherein in the "Resonance Short Circuit Operation", the multi-mode switch circuit operates such that the positive resonant output node and the negative resonant output node are short-circuited.

29. The resonant wireless power conversion method of claim 28, wherein the switch controlled rectifier circuit includes a bridge rectifier circuit which includes a first rectifier device, a second rectifier device, and the multi-mode switch circuit which includes a first multi-mode switch and a second multi-mode switch, wherein each of the first rectifier device, the second rectifier device, the first multi-mode switch and the second multi-mode switch has a current inflow node and a current outflow node;

wherein the bridge rectifier circuit is configured as (A) or (B):

(A) the current outflow nodes of the first rectifier device and the second rectifier device being connected to each other at the rectified output node; the current inflow nodes of the first multi-mode switch and the second multi-mode switch being connected to each other at the ground node; the current inflow node of the first rectifier device and the current outflow node of the first multi-mode switch being connected to each other at the negative resonant output node; and the current inflow node of the second rectifier device and the current outflow node of the second multi-mode switch being connected to each other at the positive resonant output node; or (B) the current outflow nodes of the first multi-mode switch and the second multi-mode switch being connected to each other at the rectified output node; the current inflow nodes of the first rectifier device and the second rectifier device being connected to each other at the ground node; the current inflow node of the first multi-mode switch and the current outflow node of the first rectifier device being connected to each other at the negative resonant output node; and the current inflow node of the second multi-mode switch and the current outflow node of the second rectifier device being connected to each other at the positive resonant output node;

wherein the step of converting the AC resonant signal to generate a rectified output signal further includes: controlling the first and the second multi-mode switches by the multi-mode switch control signal, such that the first and the second multi-mode switches operate in a time-divided combination of any two or more among a Synchronous Rectifying Switching Operation, a Resonance Short Circuit Operation, and an OSOC (One Synchronous-rectifying-switching, One Conductive Operation) Operation to regulate the rectified output voltage at a level corresponding to a level the output voltage reference signal, and/or to regulate the rectified output current at a level corresponding to a level of the output current reference signal.

30. The resonant wireless power conversion method of claim 29, wherein the step of converting the AC resonant signal to generate a rectified output signal further includes: controlling the first and the second multi-mode switches by the multi-mode switch control signal to operate in the Resonance Short Circuit Operation so as to limit a level of the AC resonant signal when the level of the rectified output voltage is larger than the rectified output voltage threshold and/or when the level of the rectified output current is larger than the rectified output current threshold, such that the level of the rectified output voltage is limited to be not larger than the rectified output voltage threshold, and/or the level of the rectified output current is limited to be not larger than the rectified output current threshold.

31. The resonant wireless power conversion method of claim 28, wherein each of the first and the second multi-mode switches includes a semiconductor switch.

32. The resonant wireless power conversion method of claim 28, wherein the bridge rectifier circuit further includes a first bypass diode and a second bypass diode, and the first and the second multi-mode switches are connected to the first and the second bypass diode in parallel respectively.

33. The resonant wireless power conversion method of claim 28, wherein the switch controlled rectifier circuit further includes a rectifier device, and each of the rectifier device and the multi-mode switch has a current inflow node and a current outflow node;

wherein the multi-mode switch and the rectifier device are configured as (A) or (B):

(A) the current outflow node of the multi-mode switch and the current inflow node of the rectifier device being connected to each other at the positive resonant output node, the current inflow node of the multi-mode switch being connected to the negative resonant output node, the current outflow node of the rectifier device being connected to the rectified output node, and the negative resonant output node being connected to the ground node; or (B) the current inflow node of the multi-mode switch and the current outflow node of the rectifier device being connected to each other at the positive resonant output node, the current outflow node of the multi-mode switch being connected to the rectified output node, the current inflow node of the rectifier device being connected to the ground node, the negative resonant output node being connected to the rectified output node;

wherein the step of converting the AC resonant signal to generate a rectified output signal further includes: controlling the multi-mode switch by the multi-mode switch control signal, such that the multi-mode switch operate in a time-divided combination of a Synchronous Rectifying Switching Operation and a Resonance Short Circuit Operation to regulate the rectified output voltage at the level corresponding to the level the output voltage reference signal, and/or to regulate the rectified output current at the level corresponding to the level of the output current reference signal.

34. The resonant wireless power conversion method of claim 33, wherein the step of converting the AC resonant signal to generate a rectified output signal further includes:

controlling the multi-mode switch by the multi-mode switch control signal to operate in the Resonance Short Circuit Operation so as to limit the level of the AC resonant signal when the voltage level of the rectified output voltage is larger than the rectified output voltage threshold and/or when the current level of the rectified output current is larger than the rectified output current threshold, such that the level of the rectified output voltage is limited to be not larger than the rectified output voltage threshold, and/or the level of the rectified output current is limited to be not larger than the rectified output current threshold.

35. The resonant wireless power conversion method of claim 33, wherein the multi-mode switch includes a semiconductor switch.

36. The resonant wireless power conversion method of claim 33, wherein the switch controlled rectifier circuit further includes a bypass diode connected to the multi-mode switch in parallel.

\* \* \* \* \*